US012451323B2

(12) United States Patent
Sonn-Segev et al.

(10) Patent No.: US 12,451,323 B2
(45) Date of Patent: Oct. 21, 2025

(54) FLOW FOR HIGH RESOLUTION STEREOSCOPIC MEASUREMENTS

(71) Applicant: Applied Materials Israel Ltd., Rehovot (IL)

(72) Inventors: Adar Sonn-Segev, Rehovot (IL); Gal Bruner, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 390 days.

(21) Appl. No.: 18/131,840

(22) Filed: Apr. 6, 2023

(65) Prior Publication Data
US 2024/0339289 A1 Oct. 10, 2024

(51) Int. Cl.
*H01J 37/147* (2006.01)
*G06T 3/40* (2006.01)
(Continued)

(52) U.S. Cl.
CPC ............ *H01J 37/1478* (2013.01); *G06T 3/40* (2013.01); *G06T 7/33* (2017.01); *G06T 7/38* (2017.01);
(Continued)

(58) Field of Classification Search
CPC ...... H01J 37/28; H01J 37/222; H01J 37/1478; H01J 37/305; H01J 37/3023; H01J 37/265;
(Continued)

(56) References Cited

U.S. PATENT DOCUMENTS

| 11,462,383 B2 | 10/2022 | Phaneuf et al. |
| 11,598,633 B2 | 3/2023 | Mairov et al. |

(Continued)

OTHER PUBLICATIONS

PCT/US2024/019580, "International Search Report and Written Opinion", Jul. 8, 2024, 10 pages.

*Primary Examiner* — Wyatt A Stoffa
*Assistant Examiner* — Hsien C Tsai
(74) *Attorney, Agent, or Firm* — Kilpatrick Townsend & Stockton LLP

(57) ABSTRACT

A method of determining a depth of a hole milled into a first region of a sample, comprising: positioning the sample in a processing chamber having a charged particle beam column; milling a hole in the first region of the sample using a charged particle beam generated by the charged particle beam column; identifying a first registration mark at an upper level of the milled hole; identifying a second registration mark at a lower level of the milled hole; taking a first set of images at a first tilt angle, the first set of images including a first image taken with a field of view that captures the first registration mark but not the second registration mark, and a second image taken with a field of view that captures the second registration mark but not the first registration mark; taking a second set of images at a second tilt angle, different than the first tilt angle, the second set of images including a third image taken with a field of view that captures the first registration mark but not the second registration mark, and a fourth image taken with a field of view that captures the second registration mark but not the first registration mark; using stereoscopic measurement techniques to determine the depth of the hole based on the first and second sets of images.

20 Claims, 14 Drawing Sheets

(51) Int. Cl.
*G06T 7/33* (2017.01)
*G06T 7/38* (2017.01)
*G06T 7/593* (2017.01)
*G06T 7/73* (2017.01)
*G06V 10/25* (2022.01)
*G06V 20/50* (2022.01)
*H01J 37/22* (2006.01)
*H01J 37/28* (2006.01)
*H01J 37/305* (2006.01)

(52) U.S. Cl.
CPC .............. *G06T 7/596* (2017.01); *G06T 7/73* (2017.01); *G06V 10/25* (2022.01); *G06V 20/50* (2022.01); *H01J 37/222* (2013.01); *H01J 37/28* (2013.01); *H01J 37/305* (2013.01); *G06T 2207/10012* (2013.01); *G06T 2207/10061* (2013.01); *G06T 2207/30204* (2013.01); *H01J 2237/2611* (2013.01); *H01J 2237/2815* (2013.01); *H01J 2237/31749* (2013.01)

(58) Field of Classification Search
CPC ............. H01J 37/302; H01J 2237/2815; H01J 2237/2814; H01J 2237/2611; H01J 2237/3174; H01J 2237/31745; H01J 2237/31749; H01J 2237/24578; H01J 2237/24585
See application file for complete search history.

(56) References Cited

U.S. PATENT DOCUMENTS

| | | |
|---|---|---|
| 2018/0301319 A1 | 10/2018 | Stone et al. |
| 2022/0207698 A1 | 6/2022 | Zhong et al. |
| 2022/0254060 A1 | 8/2022 | Najarian et al. |
| 2023/0057148 A1* | 2/2023 | Blayvas .............. H01J 37/3023 |
| 2024/0153738 A1 | 5/2024 | Zur |

* cited by examiner

FLOW FOR HIGH RESOLUTION STEREOSCOPIC MEASUREMENTS

BACKGROUND OF THE INVENTION

In the study of electronic materials and processes for fabricating such materials into an electronic structure, a specimen of the electronic structure can be used for microscopic examination for purposes of failure analysis and device validation. For instance, a specimen of an electronic structure such as a silicon wafer can be analyzed in a scanning electron microscope (SEM) to study a specific characteristic feature in the wafer. Such a characteristic feature may include the circuit fabricated and any defects formed during the fabrication process.

SEM imaging techniques can be used to see a surface of a region of interest (ROI) within a specimen and can also be used to see the bulk of the material within the ROI. For example, a ROI on a specimen can be bombarded with ions of Xenon, Gallium or other elements generated by a focused ion beam (FIB) column to erode the surface layer of the specimen in the ROI, thus allowing layers within the ROI below the surface, and initially covered by material above, to be imaged.

A dual column system incorporating both a scanning electron microscope and a focused ion beam (FIB) unit can produce high resolution SEM images of a localized area of an electronic structure formed on a sample, such as a semiconductor wafer. A typical dual column system includes an SEM column, an FIB column, a supporting element that supports the sample and a vacuum chamber in which the sample is placed while being milled (by the FIB column) and while being imaged (by the SEM column).

Removing one or more selected layers (or a portion of a layer) to uncover or isolate a portion of the specimen is known as delayering and can be done in a dual column system, such as that described above. For example, delayering can be done by: (i) locating a region of interest that should be milled in order to remove a certain thickness of material from the specimen, (ii) moving the sample (e.g., by a mechanical supporting element) so that the specimen is located under the FIB unit, and (iii) milling the specimen to remove a desired amount of material in the region of interest. The above steps of a delayering process can be repeated many times (e.g., tens or hundreds or thousands of times) forming a hole (sometimes referred to as a "milled box") in the specimen that is usually sized a few microns to few tens of microns in the lateral and vertical dimensions.

It is often desirable to determine the precise depth of a box milled in a sample. One way of determining the depth is with stereoscopic techniques used with an imaging device, such as a scanning electron microscope (SEM). For example, when a milled hole is viewed from different perspectives (i.e., different angles), the apparent depth of milled hole varies. The actual depth can then be determined using distances measured between the top surface of the sample and the bottom surface of the milled hole as viewed from the different perspectives.

While existing stereoscopic imaging techniques have been successfully used to determine the depth of milled holes, improvements in the accuracy or precision of such stereoscopic imaging techniques methods are desirable.

BRIEF SUMMARY OF THE INVENTION

Embodiments described herein provide improved methods and systems for measuring the depth of a hole milled in a sample. In some embodiments, a hole (e.g., a box, a trench or other structure milled into a sample) is milled in a sample using a focused ion beam (FIB) as part of a sample evaluation process. Registration marks can be formed on both the top and bottom levels of the milled hole. A first set of small field of view (FOV) images can then be taken of the top and bottom level registration marks at a first tilt angle and a second set of small FOV images can be taken of the top and bottom level registration marks at a second tilt angle, different than the first tilt angle. Each small FOV image can be taken with a scanning electron microscope with the field of view set such that each image captures a unique feature of its respective registration mark without including any overlapping area of the sample. In this manner, the pixel resolution of the small FOV images is much higher (smaller pixels) than methods that employ a larger field of view for the images in which the registration marks on the top and bottom levels of the milled hole are captured in a single image. The two sets of small FOV images can then be used to determine the height of the milled hole as described herein with a very high degree of accuracy.

While embodiments of the disclosure can be used to perform measurements on a holes milled into a variety of different types of samples, some embodiments are particularly useful in performing measurements on samples that are semiconductor wafers or similar specimens.

In some embodiments, a method of determining the depth of a hole milled into a first region of a sample is provided. The method can include: positioning the sample in a processing chamber having a charged particle beam column; milling a hole in the first region of the sample using a charged particle beam generated by the charged particle beam column; identifying a first registration mark at an upper level of the milled hole; identifying a second registration mark at a lower level of the milled hole; taking a first set of images at a first tilt angle, the first set of images including a first image taken with a field of view that captures the first registration mark but not the second registration mark, and a second image taken with a field of view that captures the second registration mark but not the first registration mark; taking a second set of images at a second tilt angle, different than the first tilt angle, the second set of images including a third image taken with a field of view that captures the first registration mark but not the second registration mark, and a fourth image taken with a field of view that captures the second registration mark but not the first registration mark; and using stereoscopic measurement techniques to determine the depth of the hole based on the first and second sets of images.

In some embodiments, a method of determining the depth of a plurality holes milled into a sample at a plurality of different regions of interest spaced apart from each other at an upper surface of the sample. The method can include: positioning the sample in a processing chamber having a focused ion beam column and a scanning electron microscope column and setting the tilt angle of the scanning electron microscope column at a first tilt angle; milling and imaging each region of interest in the plurality of regions of interest; thereafter, changing the tilt angle of the scanning electron microscope column to a second tilt angle, different than the first tilt angle; and imaging each region of interest in the plurality of regions of interest at the second tilt angle. The milling and imaging each region of interest at the first tilt angle can include: a) moving the sample within the processing chamber to position a region of interest within the field of view of the focused ion beam column; b) milling, with a charged particle beam generated by the focused ion beam column, a hole in the region of interest, a first registration mark at an upper level of the milled hole, and a second registration mark at a lower level of the milled hole; c) moving the sample withing the processing chamber to position the region of interest within the field of view of the scanning electron microscope; d) taking a first set of images at the first tilt angle, the first set of images including a first image taken with a field of view that captures the first registration mark but not the second registration mark, and a second image taken with a field of view that captures the second registration mark but not the first registration mark; and e) repeating steps (a) to (e) for a next region of interest in the plurality of regions of interest until all the regions of interest have been milled and imaged at the first tilt angle. Imaging each region of interest at the second tilt angle can include: f) moving the sample within the processing chamber to position a region of interest within the field of view of the scanning electron microscope; g) taking a second set of images at the second tilt angle, the second set of images including a third image taken with a field of view that captures the first registration mark but not the second registration mark, and a fourth image taken with a field of view that captures the second registration mark but not the first registration mark; and h) repeating steps (f) and (g) for a next region of interest in the plurality of regions of interest until all the regions of interest have been imaged at the second tilt angle; and using stereoscopic measurement techniques to calculate the depth of the hole based on the first and second sets of images.

A system for determining the depth of a hole milled into a first region of a sample is provided in some embodiments. The system can include: a vacuum chamber; a sample support configured to hold a sample within the vacuum chamber during a milling process; a charged particle beam column configured to direct a charged particle beam into the vacuum chamber; and a processor and a memory coupled to the processor. The memory can include a plurality of computer-readable instructions that, when executed by the processor, cause the system to: position the sample in a processing chamber having a charged particle beam column; mill a hole in the first region of the sample using a charged particle beam generated by the charged particle beam column; identify a first registration mark at an upper level of the milled hole; identify a second registration mark at a lower level of the milled hole; take a first set of images at a first tilt angle, the first set of images including a first image taken with a field of view that captures the first registration mark but not the second registration mark, and a second image taken with a field of view that captures the second registration mark but not the first registration mark; take a second set of images at a second tilt angle, different than the first tilt angle, the second set of images including a third image taken with a field of view that captures the first registration mark but not the second registration mark, and a fourth image taken with a field of view that captures the second registration mark but not the first registration mark; use stereoscopic measurement techniques to determine the depth of the hole based on the first and second sets of images.

In some embodiments, a non-transitory computer-readable memory that stores instructions for determining the depth of a hole milled into a first region of a sample is provided. The instructions can, when executed by a processor, cause a sample evaluation tool to: position the sample in a processing chamber having a charged particle beam column; mill a hole in the first region of the sample using a charged particle beam generated by the charged particle beam column; identify a first registration mark at an upper level of the milled hole; identify a second registration mark at a lower level of the milled hole; take a first set of images at a first tilt angle, the first set of images including a first image taken with a field of view that captures the first registration mark but not the second registration mark, and a second image taken with a field of view that captures the second registration mark but not the first registration mark; take a second set of images at a second tilt angle, different than the first tilt angle, the second set of images including a third image taken with a field of view that captures the first registration mark but not the second registration mark, and a fourth image taken with a field of view that captures the second registration mark but not the first registration mark; use stereoscopic measurement techniques to determine the depth of the hole based on the first and second sets of images.

In various implementations, embodiments can include one or more of the following features. The first registration mark can be milled at the upper level of the milled hole. The second registration mark can be milled at the lower level of the milled hole using the charged particle beam. The first tilt angle can be zero degrees and the second tilt angle can be 45 degrees. The first image of the first registration mark and the first image of the second registration mark can be non-overlapping images and the second image of the first registration mark and the second image of the second registration mark can be non-overlapping images. The charged particle beam column can be a focused ion beam column and the first charged particle beam can be an ion beam. The first and second sets of images can include images taken from an scanning electron microscope. The first registration mark can be milled at the upper level of the milled hole and the second registration mark can be milled at the lower level of the milled hole using the charged particle beam.

In various embodiments, determining the depth of the hole can include one or more of the following. Registering images in the first and second sets of images to each other by stretching the set of the images in the second set of images along a vertical axis until dimensions of the pixels in the second set of images are proportional to dimensions of the pixels in the first set of images. Using image recognition techniques to identify a unique location on each registration mark in the first and second sets of images. Registering images at the top level in the first and second sets of images to images of a uniquely identifiable mark on the sample at a known height and registering images at the bottom level in the first and second sets of images to images of the uniquely identifiable mark.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION OF THE INVENTION

Embodiments described herein provide improved methods and systems for measuring the depth of a hole milled in a sample. In some embodiments, a hole is milled in a sample using a focused ion beam (FIB) as part of a sample evaluation process. Registration marks can be formed on both the top and bottom levels of the milled hole. A first set of images can then be taken of the top and bottom level registration marks at a first tilt angle and a second set of images can be taken of the top and bottom level registration marks at a second tilt angle, different than the first tilt angle.

In some embodiments, the images in the first and second sets of images can be taken with a scanning electron microscope with the field of view set such that each image captures a unique feature of its respective registration mark without including any portion of the other registration mark. That is, the images that capture the top level registration mark will not include any portion of the bottom registration mark and vice-versa. Such images can be referred to herein as "small field of view" or "small FOV" images in contrast to larger FOV images that include both registration marks in a single image. Further, in some embodiments, in each set of images, the image of the top level registration mark and image of the bottom level registration mark do not include any overlapping area of the sample.

The pixel resolution of the small FOV images captured according to embodiments disclosed herein is much higher (smaller pixels) than methods that employ a larger field of view for the images in which the registration marks on the top and bottom levels of the milled hole are captured in a single image. The two sets of small FOV images can then be used to determine the height of the milled hole as described herein with a very high degree of accuracy.

While embodiments of the disclosure can be used to perform measurements on a holes milled into a variety of different types of samples, some embodiments are particularly useful in performing measurements on samples that are semiconductor wafers or similar specimens.

As used herein, the terms "hole" and "box" can refer generically to a box, a trench or other structure milled into a sample where one or more surfaces of the hole are below the original surface of the sample prior to the milling operation.

Example Sample Evaluation Tool

Figure 1A:
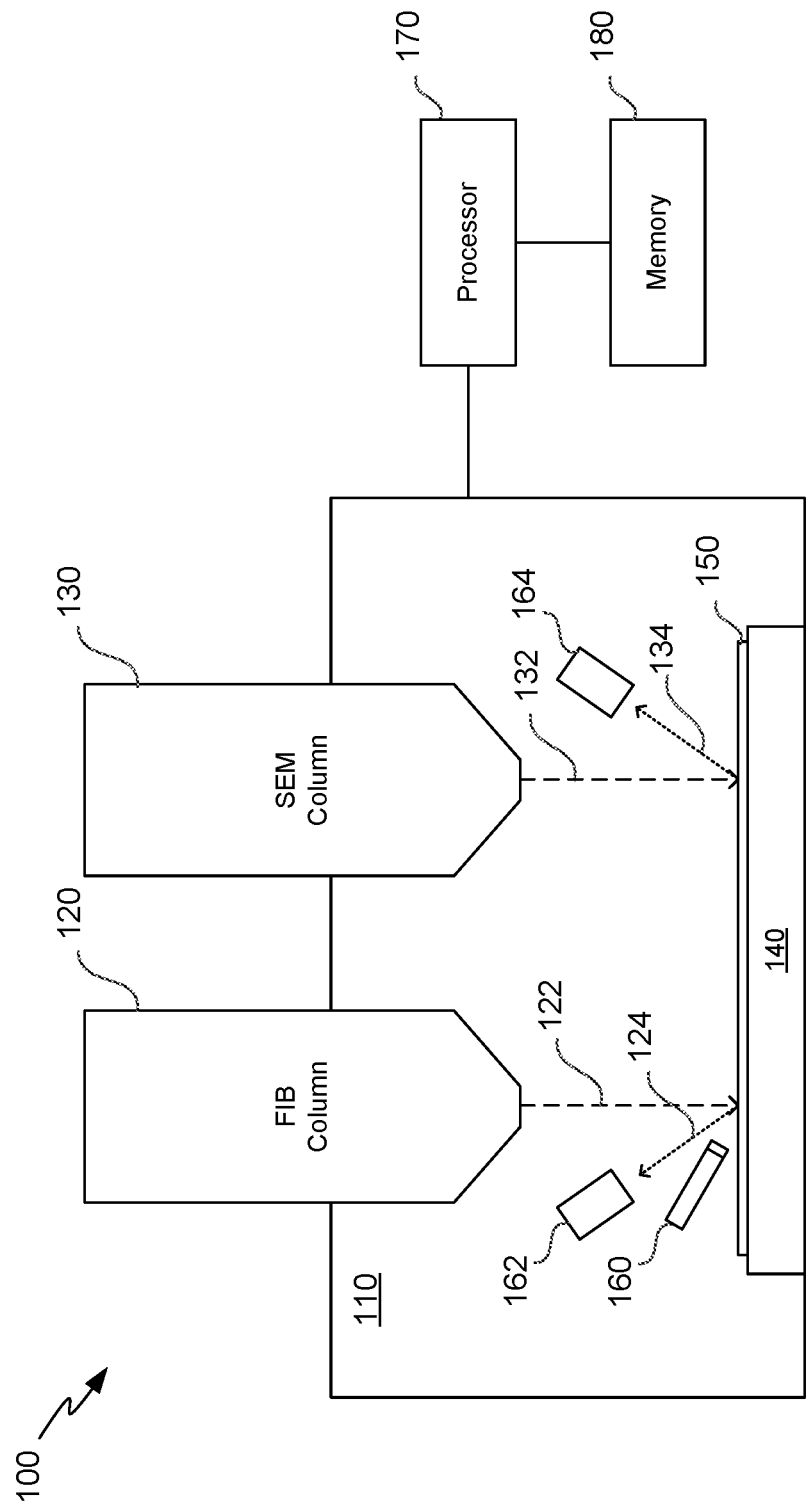
FIG. 1A is a simplified illustration of a sample evaluation system according to some embodiments of the disclosure.

In order to better understand and appreciate the disclosure, reference is first made to FIG. 1A, which is a simplified schematic illustration of a sample evaluation system 100 in accordance to some embodiments of the disclosure. Sample evaluation system 100 can be used for, among other operations, defect review and analysis of structures formed on samples such as semiconductor wafers.

As shown in FIG. 1A, sample evaluation system 100 can include, among other elements, a vacuum chamber 110, a focused ion beam (FIB) column 120, a scanning electron microscope (SEM) column 130, a sample supporting element 140, a gas injection nozzle 160 and, optionally, secondary electron detectors 162, 164 (or in some embodiments, secondary ion detectors, or a combination of the two detectors working in parallel). FIB column 120 and SEM column 130 are connected to vacuum chamber 110 so that a charged particle beam generated by either one of the charged particle columns propagates through a vacuumed environment formed within vacuum chamber 110 before impinging on sample 150. For example, FIB column 120 is operable to generate a charged particle beam 122 and direct the charged particle beam 122 towards a sample 150 (sometimes referred to herein as an "object" or a "specimen") to mill or otherwise process the sample. SEM column 130 can generate an image of a portion of sample 150 by illuminating the sample with a charged particle beam 132, detecting particles emitted due to the illumination, and generating charged particle images based on the detected particles.

The sample 150, for example a semiconductor wafer, can be supported on the sample supporting element 140 within vacuum chamber 110. Sample supporting element 140 can also move regions of the sample within vacuum chamber 110 between the field of view of the two charged particle columns 120 and 130 as required for processing. For example, the FIB column 120 can be used to mill a region on the sample 150 and the supporting element 140 can then move the sample so that the SEM column 130 can image the milled region of the sample 150.

FIB column 120 can mill (e.g., drill a hole in) sample 150 by irradiating the sample with one or more charged particle beams to form a cross section or a hole. An FIB milling process typically operates by positioning the specimen in a vacuum chamber 110 and emitting a beam of ions towards the specimen to etch or mill away material on the specimen. Common milling processes form a cross section of the sample 150 and, if desired, can also smooth the cross section. In some instances, the vacuum environment can be purged with background gases that serve to control the etch speed and other parameters. The accelerated ions can be generated from Xenon, Gallium or other appropriate elements and are typically accelerated towards the specimen by voltages in the range of 500 volts to 100,000 volts, and more, typically falling in the range of 3,000 volts to 30,000 volts. The beam current is typically in the range from several pico amps to several micro amps, depending on the FIB instrument configuration and the particular application, and the pressure is typically controlled between $10^{-10}$ to $10^{-5}$ mbar in different parts of the system and in different operation modes.

During a milling operation, the charged particle beam 122 generated by the FIB column 120 propagates through a vacuum environment formed within vacuum chamber 110 before impinging on the sample 150. Secondary electrons and ions 124 are generated in the collision of ions with the sample and can be detected by the detector 162. The detected secondary electrons or ions 124 can be used to analyze characteristics of the milled layers and the structure, can be used to determine an endpoint of a milling process, and/or can be used to form an images.

During a particle imaging operation, the charged particle beam 132 generated by the SEM column 130 propagates through the vacuum environment formed within the vacuum chamber 110 before impinging on the sample 150. Secondary electrons 134 are generated in the collision of electrons with the sample 150 and can be detected by the detector 164. The detected secondary electrons 134 can be used to form images of the milled area and/or to analyze characteristics of the milled layers and the structure.

Particle imaging and milling processes each typically include scanning a charged particle beam back-and-forth (e.g., in a raster scan pattern) at a constant rate across a particular area of the sample being imaged or milled. One or more lenses (not shown) coupled to the charged particle column can implement the scan pattern as is known to those of skill in the art. The area scanned is typically a very small fraction of the overall area of sample. For example, the sample can be a semiconductor wafer with a diameter of either 200 or 300 mm while each area scanned on the wafer can be a rectangular area having a width and/or length measured in microns or tens of microns.

During some processing operations, one or more gases can be delivered into chamber 110 by a gas injection system 160. For simplicity of explanation gas injection system 160 is illustrated in FIG. 1A as a nozzle, but it is noted that gas injection system 160 can include gas reservoirs, gas sources, valves, one or more inlets and one or more outlets, among other elements. In some embodiments gas injection system 160 can be configured to deliver gas to a localized area of sample 150 that is exposed to the charged particle beam as opposed to delivering gas to an entire upper surface of the sample. For example, in some embodiments gas injection system 160 has a nozzle diameter measured in hundreds of microns (e.g., between 400-500 microns) that is configured to deliver gas directly to a relatively small portion of the sample's surface that encompasses the charged particle beam scan pattern or collision zone. In various embodiments, a first gas injection system 160 can be configured to deliver gas to a sample disposed under FIB column 120 and a second gas injection system 160 (not shown) can be configured to deliver gas to a sample disposed under SEM column 130.

As shown in FIG. 1A, system 100 can include one or more controllers, processors or other hardware units 170 that control the operation of system 100 by executing computer instructions stored in one or more computer-readable memories 180 as would be known to persons of ordinary skill in the art. By way of example, the computer-readable memories can include a solid-state memory (such as a random access memory (RAM) and/or a read-only memory (ROM), which can be programmable, flash-updateable and/or the like), a disk drive, an optical storage device or similar non-transitory computer-readable storage mediums.

Figure 1B:
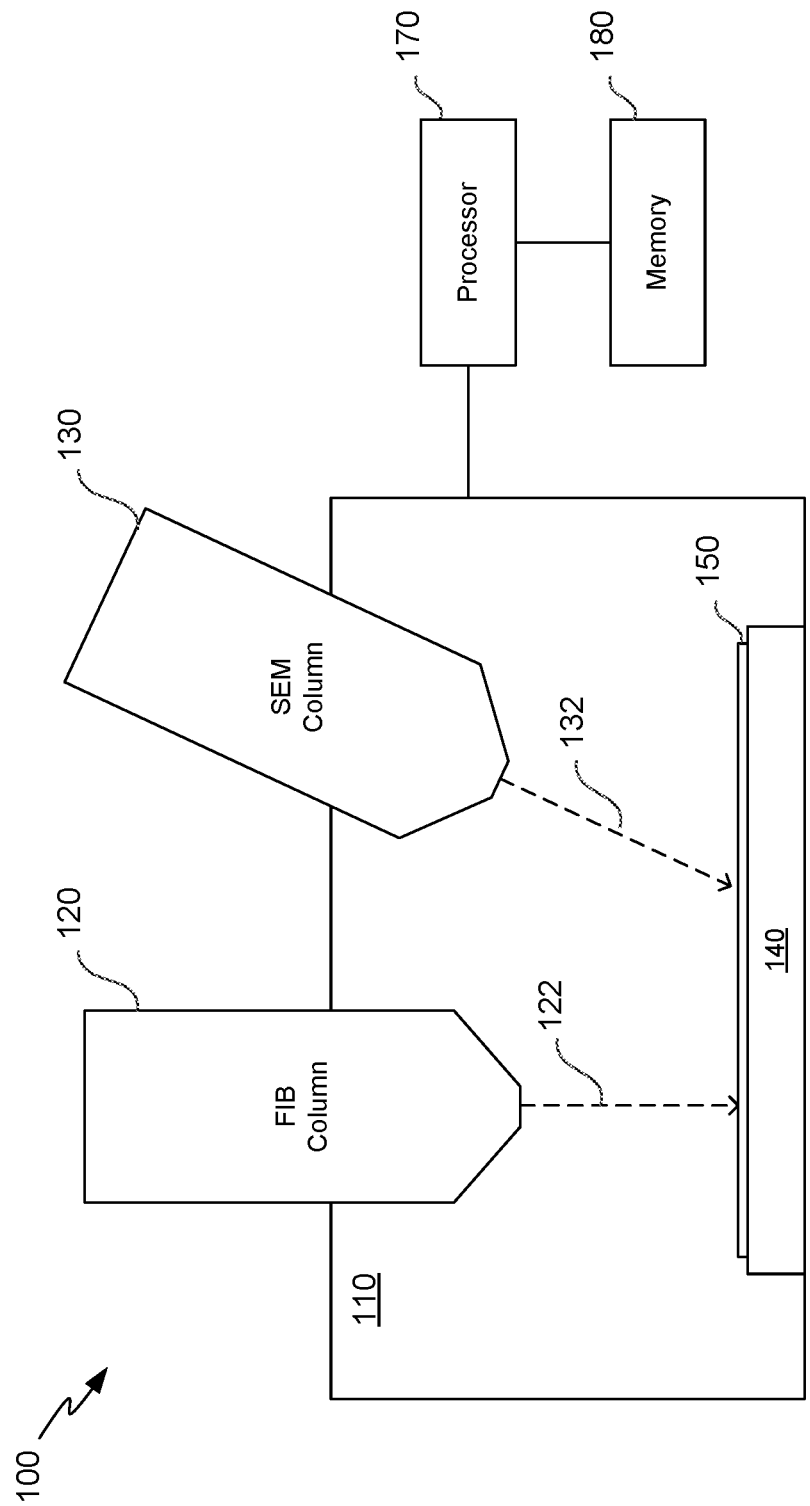
FIG. 1B is simplified illustration of a sample evaluation system shown in FIG. 1A with the SEM column tilted according to some embodiments.

FIG. 1B shows the substrate inspection system 100 with the SEM column 130 tilted. As explained more fully below, SEM column 130 can be tilted relative to a surface of the sample 150 to obtain images from different angles relative to a surface of sample 150 (or from different perspectives). Alternatively, in some embodiments, the supporting element 140 can be configured to tilt the sample 150 so that images can be obtained from different angles. Gas nozzle 160 and detectors 162, 164 are not shown in FIG. 1B for ease of illustration.

The inspection system 100 shown in FIGS. 1A and 1B is provided as an example of a system that can be used with some of the embodiments described herein. It should be appreciated that the embodiments are not limited to the inspection system 100, and other inspection systems can be used with some embodiments. Also, in some embodiments, an FIB tool can be used to mill a hole in a sample, and a separate SEM tool can be used to obtain images of the hole.

General Concepts—Stereoscopic Measuements with an SEM Instrument

Stereoscopic techniques can be used with an imaging device, such as scanning electron microscope column 130, to determine the thickness or depth of different structures formed on a sample. One technique for doing such is described in commonly assigned U.S. patent application Ser. No. 17/983,225 filed on Nov. 8, 2022, and entitled "Improved Precision in Stereoscopic Measurements using a Pre-Deposition Layer". The Ser. No. 17/983,225 application is incorporated by reference herein in its entirety for all purposes but, for the sake of convenience, a brief description of the stereoscopic measurement technique described in the Ser. No. 17/983,225 application as applied to determining the depth of a milled hole is presented below with reference to FIGS. 2A-3B.

Figure 2A:
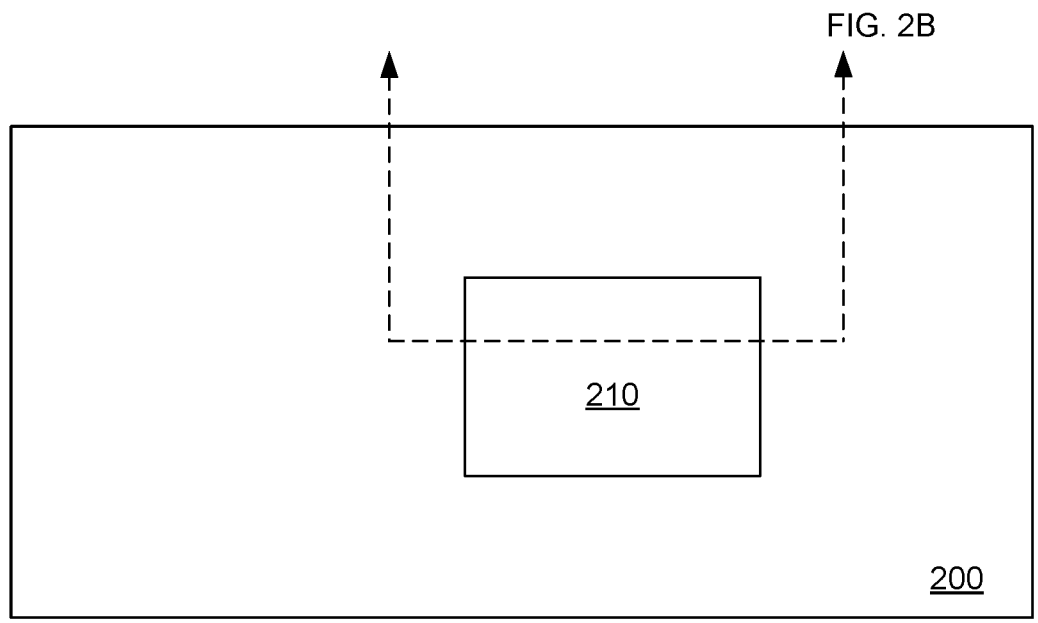
FIG. 2A is a simplified top-down view of a sample having a milled box.
Figure 2B:
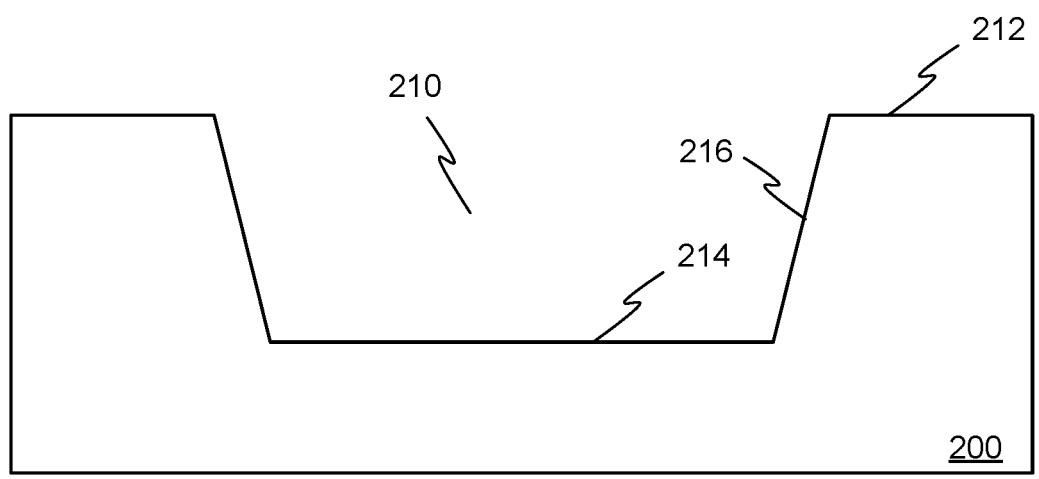
FIG. 2B is a simplified cross-sectional view of a portion of the sample shown in FIG. 2A.

Shown in FIGS. 2A and 2B are simplified top-down and cross-sectional views, respectively, of an example hole 210 (sometimes referred to herein as "box 200") that has been milled in a sample 200. As shown in FIG. 2B, the depicted box 210 includes sidewalls 216 formed between an upper surface 212 of sample 200 and a lower surface 214 of the box. Stereoscopic imaging techniques discussed below can be used to determine the depth (height) of box 210, i.e., the distance between upper surface 212 and lower surface 214.

When box 210 is viewed from different perspectives, the apparent depth of the box, as indicated by a distance between top surface (level) 212 and bottom surface (level) 214 varies. More specifically, an apparent distance between the top and bottom surfaces 212, 214 of the box 210 increases as a tilt angle increases, reaching a maximum at a particular tilt angle that depends on the slope of sidewall 216, and then decreases with further increases in the tilt angle.

Figure 3A:
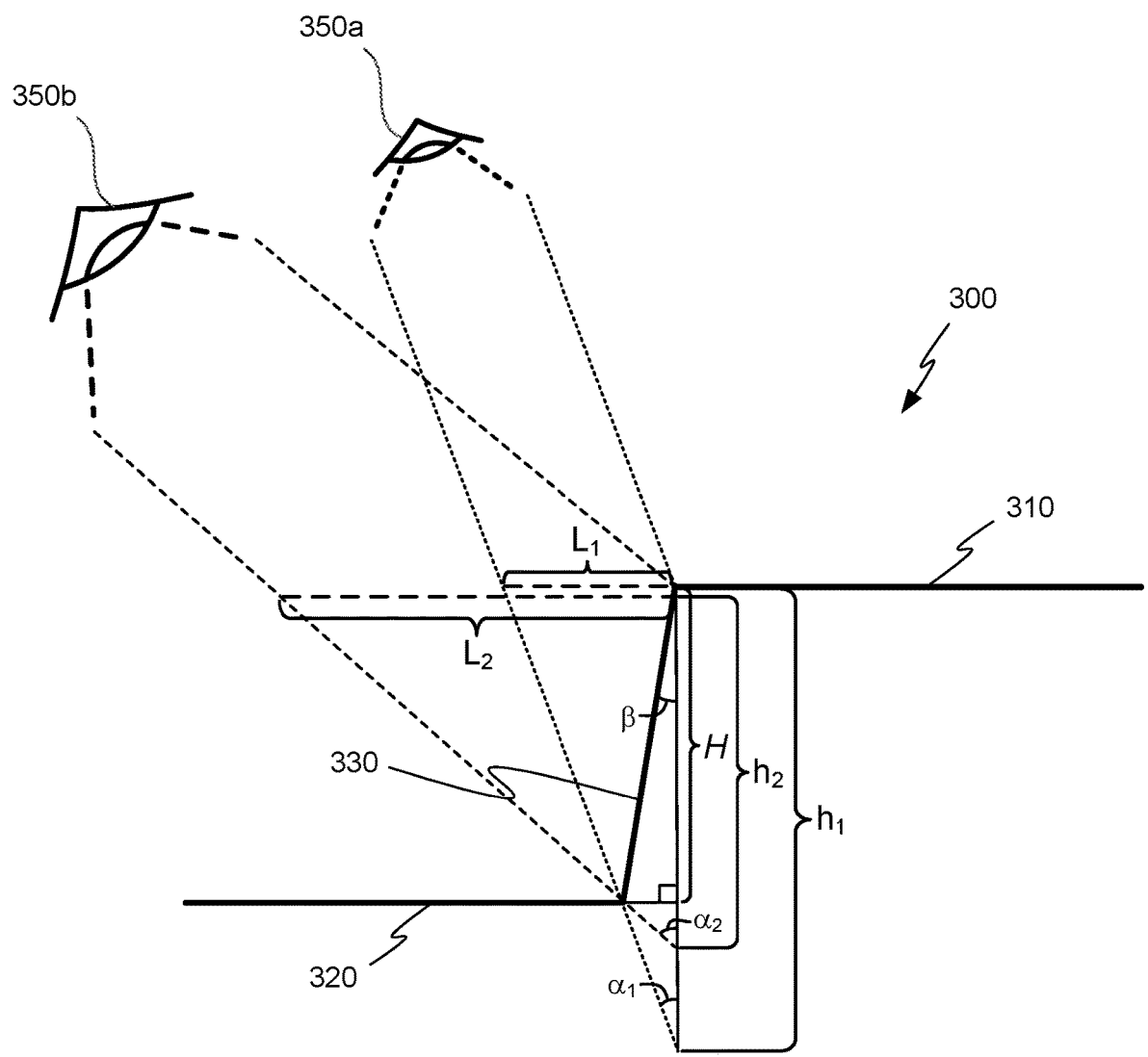
FIG. 3A is a simplified diagram illustrating how a vertical depth of a structure, such as the milled box shown in FIGS. 2A and 2B, can be determined using stereoscopic imaging techniques.

The depth or height of box 210 (a vertical distance) can be determined using distances measured between the top and bottom surfaces of the box as viewed from different perspectives. FIG. 3A is a simplified diagram illustrating how a vertical depth of a structure 300 (such as box 210) can be determined using stereoscopic imaging techniques. For ease of illustration, upper and lower surfaces of the structure 300 layer are represented in this figure by horizontal lines 310, 320, respectively. The horizontal lines are connected by a line 330 representing the sidewall of the structure 300, which in this particular example is sloped at an angle β from the vertical. While sidewall 330 is shown in FIG. 3A as having an angled slope, in some instances sidewall 330 will be completely normal, or almost completely normal, to upper and lower surfaces 212, 214 such that β=0.

In this example, a first image of the sidewall is obtained from a first perspective 350a at a first tilt angle $\alpha_1$, and a second image is obtained from a second perspective 350b at a second tilt angle $\alpha_2$. The tilt angles $\alpha_1$ and $=_2$ can be user defined and/or can be obtained from or determined by the imaging device. The vertical height or depth of the structure 300 is represented by H.

When analyzing features from a titled perspective, most conventional SEM imaging devices measure distance projected onto a horizontal or vertical plane. As an example, in FIG. 3A the distance projected onto the horizontal plane from the first perspective 350a is $L_1$, and the distance projected onto the vertical plane from the first perspective is $h_1$. Similarly, the distance projected onto the horizontal plane from the second perspective 350b is $L_2$, and the distance projected onto the vertical plane from the second perspective is $h_2$. In accordance with some embodiments, these measured distances can be used along with the tilt angles $\alpha_1$ and $\alpha_2$ to determine the vertical height H of structure 300 using either of the following equations:

$$H = \frac{L2 - L1}{\tan(\alpha 2) - \tan(\alpha 1)} \quad (1)$$

$$H = \frac{h2\tan(\alpha 2) - h1\tan(\alpha 1)}{\tan(\alpha 2) - \tan(\alpha 1)} \quad (2)$$

Figure 3B:
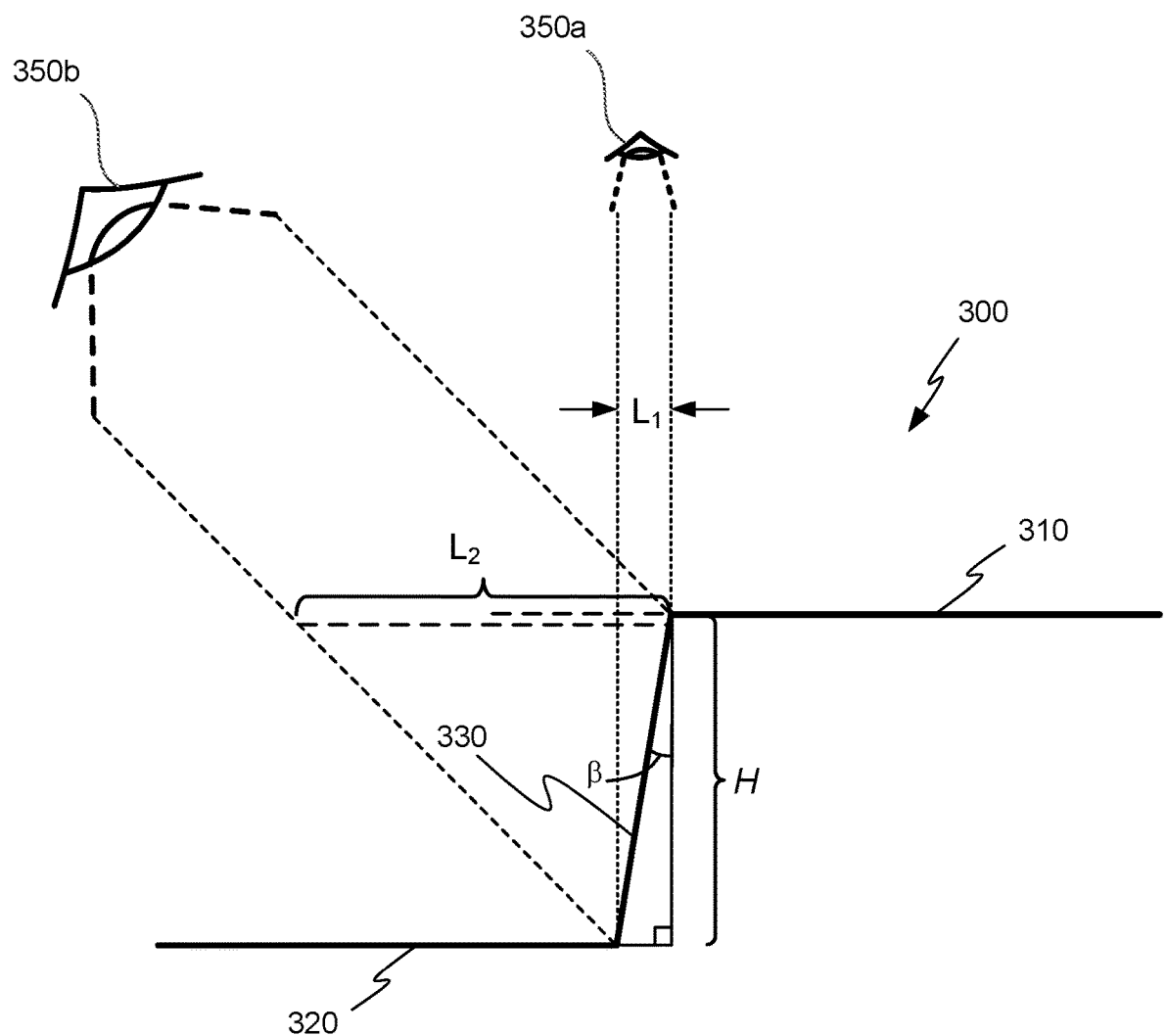
FIG. 3B is a simplified diagram illustrating how a vertical depth of a structure, such as the milled box shown in FIGS. 2A and 2B, can be determined using stereoscopic imaging techniques with images taken at 0 and 45 degrees, respectively.

In some instances, the first perspective 350a can be approximately top-down (normal to a surface of the sample), and the second perspective 350b can be approximately 45° to the surface of the sample. In such a configuration, which is depicted in FIG. 3B, the vertical height H of structure 300 layer can be simplified and determined using the equation:

$$H = L2 - L1 \quad (3)$$

Evident from the above discussion, in order to accurately determine the depth of a milled hole or box, points that accurately represent the top and bottom surfaces of the milled hole need to be determined. The example discussed with respect to FIGS. 3A and 3B assumes that the top and bottom edges of structure 300 are readily identifiable. Such is not always the case, however. For example, as described in the Ser. No. 17/983,225 application, in some instances it is not easy to readily identify the precise portions of the top surface of a sample surrounding a milled hole. It can also be challenging in some instances to precisely identify the demarcation between sidewall 316 and bottom surface 314.

Thus, to ensure that points used in a stereoscopic calculation of the depth of a milled hole accurately represent the top and bottom surfaces of the milled hole, embodiments disclosed herein mark the top and bottom surfaces with features at locations that spaced apart a distance from the top and bottom edges of the sidewall such that the marked features accurately represent the top and bottom surfaces (levels) of the milled hole. The marked features can be any shape or feature that is readily identifiable in images and on which a unique location in the marked feature can be determined. As a non-limiting example, in some embodiments, the marked features are crosses or X's and the unique location can be the center point of the cross or X. Once the location of the marked features is identified, the features can then be used accurately determine the depth of holes using the techniques described below.

Figure 4A:
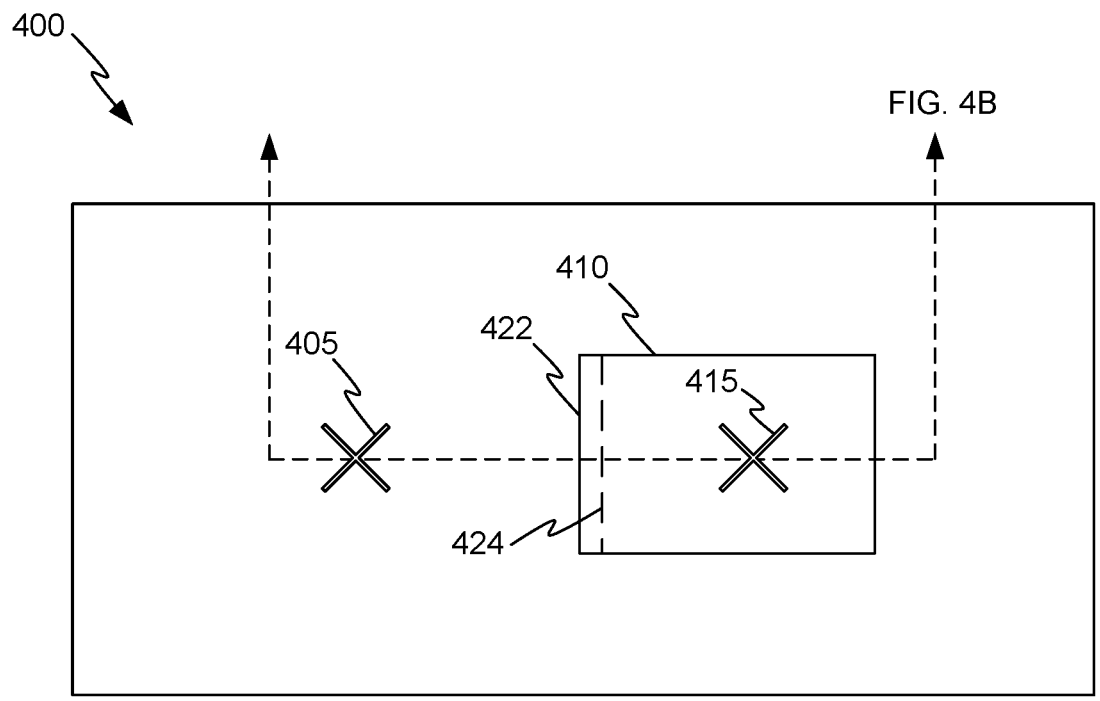
FIG. 4A is a simplified top plan view of a sample having a milled box.
Figure 4B:
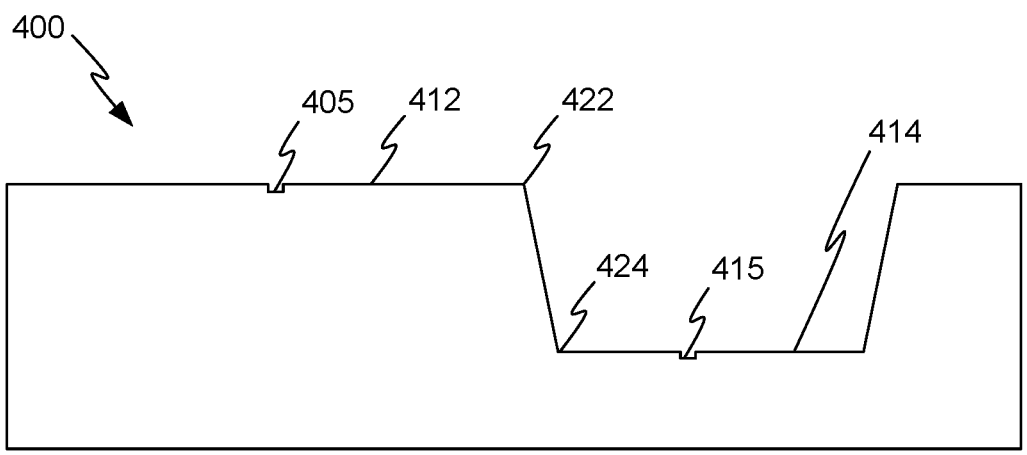
FIG. 4B is a simplified cross-sectional view of a portion of the sample shown in FIG. 4A.

To illustrate, reference is made to FIGS. 4A and 4B. FIG. 4A is a simplified top plan view of a sample 400 having a milled box 410 according to embodiments, and FIG. 4B is a simplified cross-sectional view of a portion of sample 400. As shown in FIG. 4A, a top surface of milled box 410 can be marked with a feature 405 that is spaced apart from a top edge 422 of the milled box, and a bottom surface of the milled box can be marked with a feature 415 that is spaced apart from a bottom edge 424 of the milled box. The depth of milled box 410 can thus be accurately determined using stereoscopic techniques, such as those described above, based on the distance between marks 405 and 415.

Figure 5:
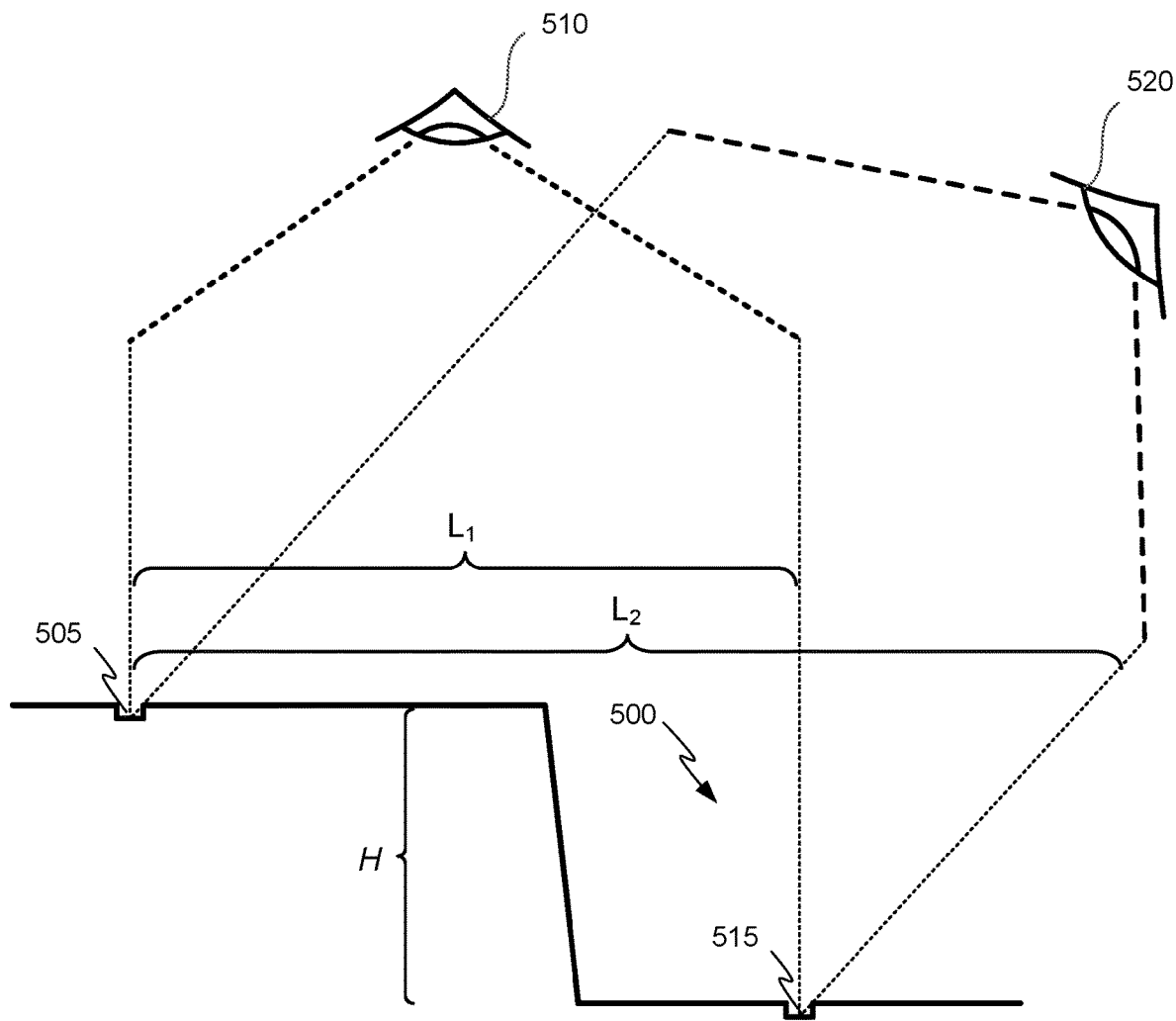
FIG. 5 is a simplified diagram illustrating how a vertical depth of a structure, such as the milled box shown in FIGS. 4A and 4B, can be determined using stereoscopic imaging techniques.
Figure 6A:
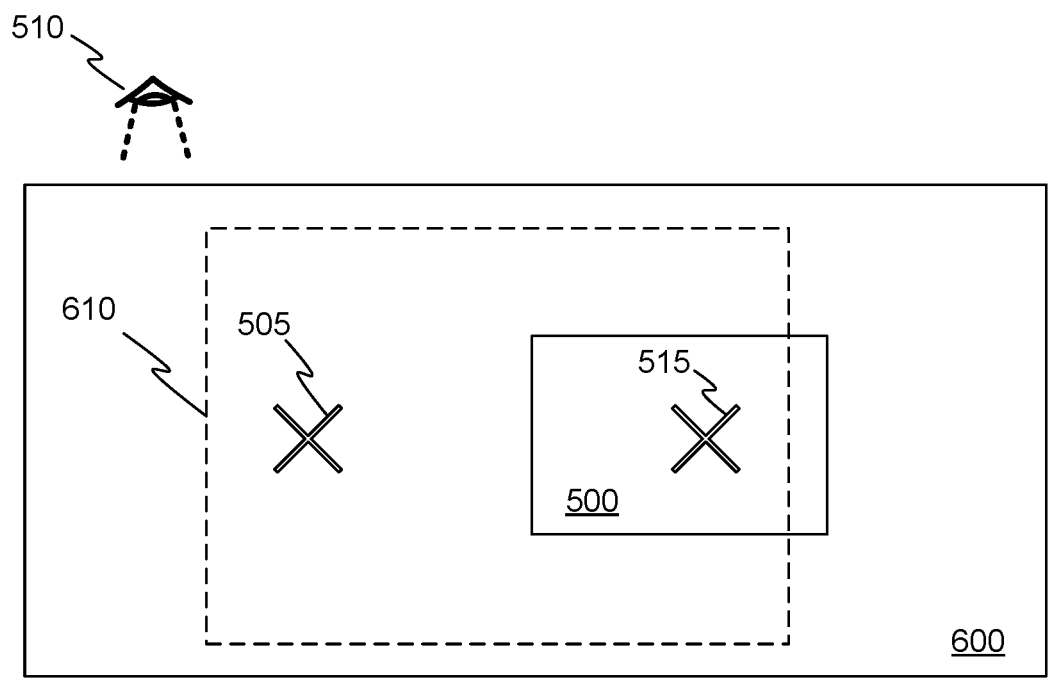
FIGS. 6A and 6B are simplified top-down illustrations of a sample having a milled box in which images of the milled box are taken at two different perspectives.
Figure 6B:
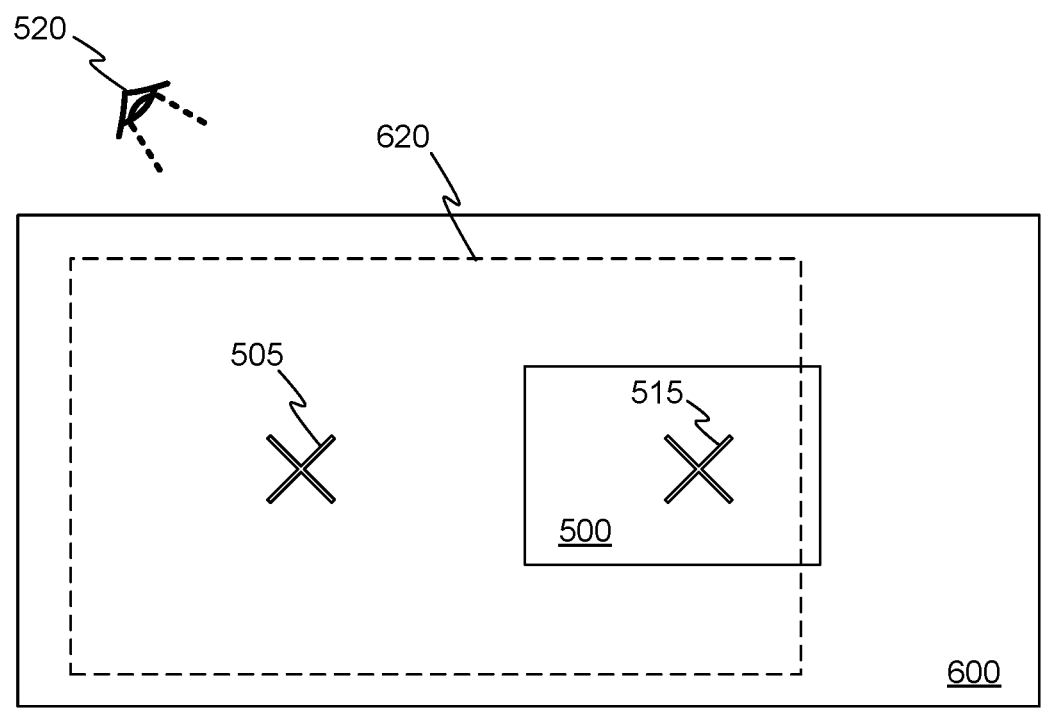

FIG. 5 is a simplified diagram illustrating how a vertical depth of structure 500, which can be milled into a sample 600 that is representative of the sample 400 shown in FIGS. 4A and 4B, can be determined using stereoscopic imaging techniques. As depicted in FIG. 5, structure 500 can include markings 505 and 515 that are similar to and similarly positioned to marking 405 and 415 discussed above. Images of sample 500 can be taken from two different perspectives 510, 520. In previously known techniques, each of the two images is taken with a field of view (FOV) that is sufficient to capture both marking feature 505 and marking feature 515. For example, as shown in FIG. 6A, a FOV 610 from perspective 510 can capture both marks 405 and 415, and as shown in FIG. 6B, a FOV 620 from perspective 520 can also capture both marks 405, 415.

When captured as thus, the stereoscopic techniques described above with respect to FIG. 3A or 3B can then be used to calculate the depth of the milled hole from the height differences between points 405 and 415. For example, when perspective 510 is approximately top-down (normal to a surface of sample 400) and perspective 520 is approximately 45° to the surface of the sample, the vertical height H of structure 410 can be simplified and determined using the equation discussed above with respect to FIG. 3B: H=L2−L1.

The accuracy of any such calculation using stereoscopic techniques is partially dependent on the pixel size of the images taken at the different perspectives. Images composed with relatively large pixels cannot accurately detect very small feature sizes. Any given imaging device has a fixed or limited number of pixels. The field of view (FOV) of that imaging device thus determines the pixel size. For example, if an imaging device has a resolution of 1920×1920 pixels (approximately 3.6 million pixels), the pixel size of a first image taken with a FOV that is 60×60 microns will be larger than the pixel size of a second image taken with a FOV that is 6×6 microns. Specifically, the size of each pixel in the first image will be approximately 31 nm while the size of each pixel in the second image will be approximately 3.1 nm—an order of magnitude smaller than the pixels in the first image.

Stereoscopic Measurement Techniques using Separate, Small FOV Images

Instead of taking images at different perspectives where each image captures both the marked feature at the top surface of a milled box and the marked feature at a bottom surface of the milled box as described above, embodiments disclosed herein can take two sets of small FOV, high resolution images at different perspectives (four images in total). In some embodiments, the images in each set of images are non-overlapping such that a first image captures the mark at the top surface of the milled box, the second image captures the mark at the bottom surface of the milled box, and no portion of the imaged sample is in both the first and second images. According to embodiments disclosed herein, the FOV of each of the two high resolution images can be significantly smaller than the FOV that would be required for a single image to capture both marks enabling significantly smaller pixel sizes in each image.

1. Increased Resolution with Smaller Pixels

Figure 7A:
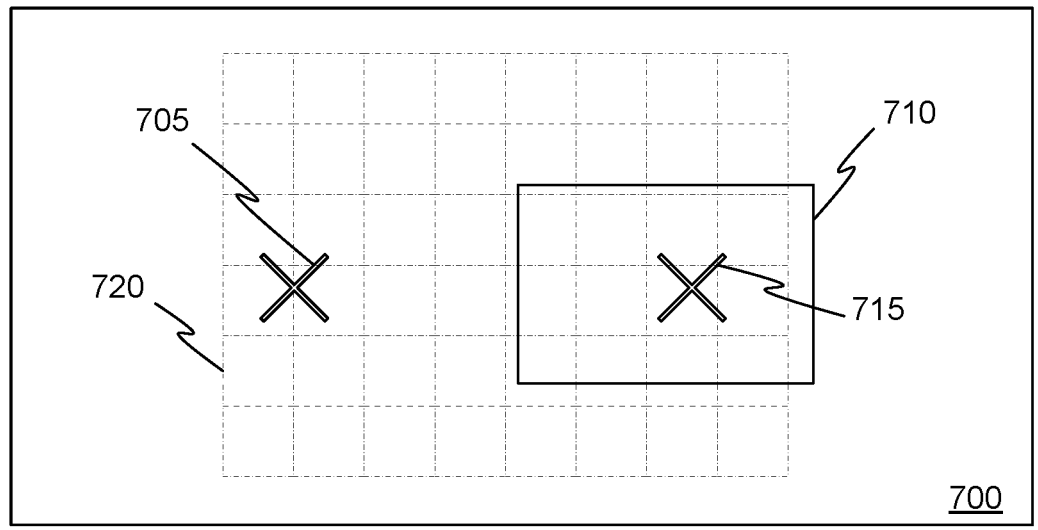
FIG. 7A is a simplified illustration depicting the field of view and pixel size of a single image that captures registration marks formed at the top and bottom surfaces of a hole milled on a sample.
Figure 7B:
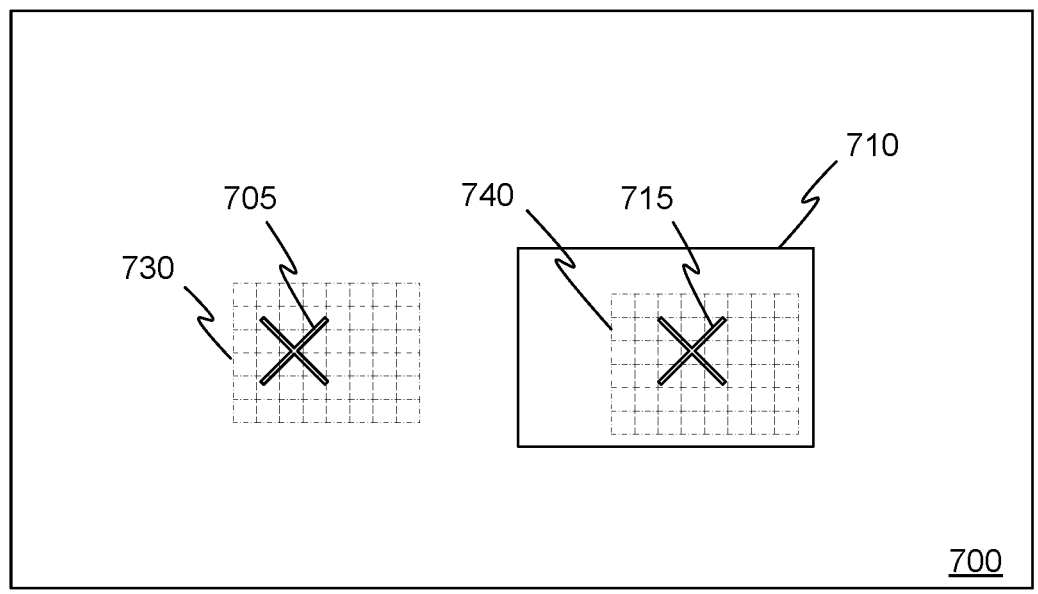
FIG. 7B is a simplified illustration depicting the fields of view and pixel size of two separate images that separately capture registration marks formed at the top and bottom surfaces of a hole milled on a sample according to some embodiments.

To illustrate, reference is made to FIGS. 7A and 7B, which are each simplified top-down illustrations of a sample 700 having a milled box 710 formed thereon and having first and second marks 705, 715 formed on the top and bottom surfaces of milled 710, respectively. FIGS. 7A and 7B each represent a sample evaluation system with an imaging device that has a resolution of 8 pixels along the X axis and 6 pixels along the Y axis for a total of 48 pixels. It is to be understood that imaging systems in actual sample evaluation systems will typically have a much higher pixel count (e.g., millions or many millions of pixels) and that the 8×6 pixel array depicted in FIGS. 7A and 7B is for ease of illustration only.

In FIG. 7A a single image 720 has been taken in accordance with previously known techniques where a FOV is sufficiently large such that image 720 captures both mark 705 and mark 715. The 48 pixels that make up image 720 are represented in FIG. 7A as dotted lines (squares) but not labeled with a particular reference number. In FIG. 7B, two separate images 730, 740 have been taken where each image has a much smaller field of view such that image 730 captures mark 705 but none of mark 715 and image 740 captures mark 715 but none of mark 705. Each of images 730, 740 includes the same 48 pixels as image 720, but because the images are taken over a much smaller FOV, each pixel in images 730, 740 is much smaller (i.e., more granular) than the pixels in image 720. The smaller, more granular pixel sizes in images 730, 740 enable embodiments disclosed herein to have improved resolution in measuring the depth of a milled hole as compared to some previously known techniques. For example, the higher resolution enables a greater accuracy in determining the exact location of each registration mark 705, 715. The increased accuracy of locating an exact location of each registration mark then, in turn, enables an increased accuracy in measuring the height of the milled box.

2. General Process Flow

Figure 8:
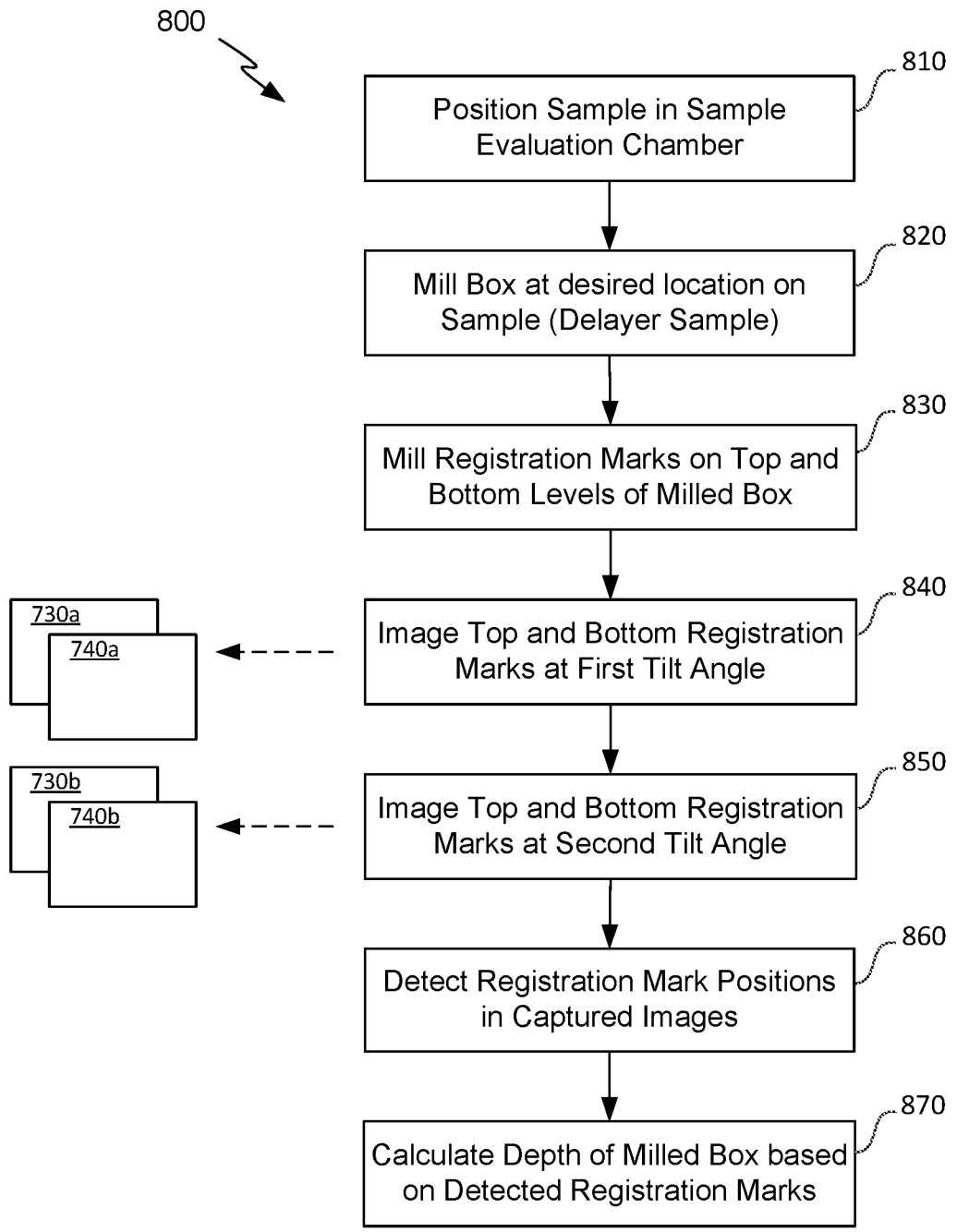
FIG. 8 is a simplified flow chart depicting the steps associated with a method of determining the depth of a milled hole according to some embodiments.

Reference is now made to FIG. 7B and FIG. 8, which is a simplified flow chart depicting steps associated with a method 800 of determining the depth of a milled hole using separate, small FOV images according to some embodiments. As shown in FIG. 8, method 800 starts by positioning a sample (e.g., sample 700 prior to the formation of box 710 and registration marks 705, 715) on a sample support in a chamber of an appropriate evaluation system (block 810).

For example, in some embodiments, step 810 includes positioning sample 700, which can be representative of sample 150 (FIG. 1A) on sample support 140 within vacuum chamber 110 of sample evaluation system 100. A region of interest (i.e., a region to be evaluated) on the sample can then be moved under the field of view of the focused ion beam column 120 and the region of interest can be delayered by milling a box 710 into the sample (block 820) using techniques described above in conjunction with FIG. 1A as is known to those of skill in the art.

Next, registration marks (e.g., marks 705, 715) can be milled into the top level and bottom level of the milled box, respectively, with FIB column 120 (block 830). The registration marks can be milled at their respective locations on the top and bottom levels of milled box 710 without moving the sample using the various lenses associated with FIB column 120. Mark 715 can be formed within milled box 710 at a location that is a known distance and direction from mark 705 and system 100 can store the distance and directional vector between the two marks in order in a computer-readable memory. This saved information can then later be used to ensure that the small FOV images of each properly capture the marks. Thus, the first registration mark can be viewed as an anchor that identifies the location of the second registration mark.

It's worth noting that, while registration mark 715 is generally always formed within milled box 710 after the box is milled, registration mark 705 can be milled into the top surface (upper level) of sample 700 either before or after box 710 is milled. Thus, in some embodiments, registration mark 705 can be milled prior to block 820 and only registration mark 715 is milled in block 830.

After sample 700 has been delayered (box 710) and registration marks 705, 715 have been formed, the sample can be moved within chamber 110 such that the region of interest is under the field of view of SEM column 130 and a first set of small FOV images of the registration marks can be taken by the SEM column (block 840). This first set of small FOV images is taken with SEM column 130 positioned at a first tilt angle. In some embodiments, the first tilt angle is 0 degrees such that the electron beam 132 emitted from SEM column 130 collides with sample 700 at an angle normal to the surface of the sample. The first set of small FOV images includes a first small FOV image of registration mark 705 at the top level of milled box 710 taken at the first tilt angle and a second small FOV image of registration mark 715 at the bottom level of milled box 710 taken at the first tilt angle.

The second small FOV image can be taken by moving or "jumping" the SEM charged particle beam from a known location on the first registration mark to a location at which the second registration mark was formed based on the saved distance and vector information discussed above. When taking SEM image of the registration mark 715 formed at the bottom surface of milled box 710 at a tilt angle other than zero degrees, the focus point of SEM column 130 can be jumped from the first image to the second image based on the saved distance and vector information discussed above combined with the tilt angle of the SEM column and the expected depth of the milled box as discussed below in conjunction with FIGS. 9A and 9B.

The first small FOV image of registration mark 705 can be representative of image 730 shown in FIG. 7B and the first small FOV image of registration mark 715 can be representative of image 740 shown in FIG. 7B. Since FIG. 7B did not discuss the angle at which the small FOV images are taken, however, and since method 800 includes taking images of each of the registration marks 705, 715 at two different angles, FIG. 8 depicts the first and second images generated during block 840 as images 730*a* and 740*a*, respectively.

Next, SEM column 130 is tilted to a second tilt angle, different from the first tilt angle, and a second set of small FOV images is taken with SEM column 130 positioned at a second tilt angle (block 850). In some embodiments, SEM column 130 is tilted such that the electron beam 132 emitted from the SEM column during block 850 collides with sample 700 at an angle of 45 degrees. The second set of small FOV images includes a second small FOV image of registration mark 705 at the top level of milled box 710 taken at the second tilt angle and a second small FOV image of registration mark 715 at the bottom level of milled box 710 taken at the second tilt angle. Again, the second small FOV image can be taken by jumping the charged particle beam from the SEM column a known distance as described above and in conjunction with FIGS. 9A and 9B below to ensure that it captures registration mark 705. The second small FOV image taken during block 850 that captures mark 705 can also be representative of image 730 shown in FIG. 7B and the second small FOV image that captures registration mark 715 can also be representative of image 740 shown in FIG. 7B. FIG. 8 depicts the two second set images generated during block 850 of marks 705 and 715 as images 730*b* and 740*b*, respectively.

After the two sets of images (730*a*, 740*a* and 730*b*, 740*b*) have been captured, image processing techniques can be used to accurately detect the same position in the each of markings 705 and 715 at the two different tilt angle (block 860) and the depth of milled box 710 can then be calculated (block 870) according to any of the various techniques discussed below in Section 4.

3. Determining the Location for Small FOV Images of the Lower Level Registration Mark In order to accurately capture registration mark 715 at the lower level of milled box 710 in an image taken in either block 840 or 850 where the SEM column is at an angle other than 0 degrees, system 100 can adjust the location of the small FOV image taken of mark 715 based on the expected depth of the milled hole. To illustrate, reference is made to FIGS. 9A and 9B, which are simplified diagrams depicting the distance between registration marks on the top and bottom levels of a milled box 910 when viewed from different angles. Milled hole 910 can be representative of milled box 710 discussed above and include registration marks 905 and 915 formed on the top and bottom levels of the milled hole, respectively, that can be representative of registration marks 705 and 715.

Figure 9A:
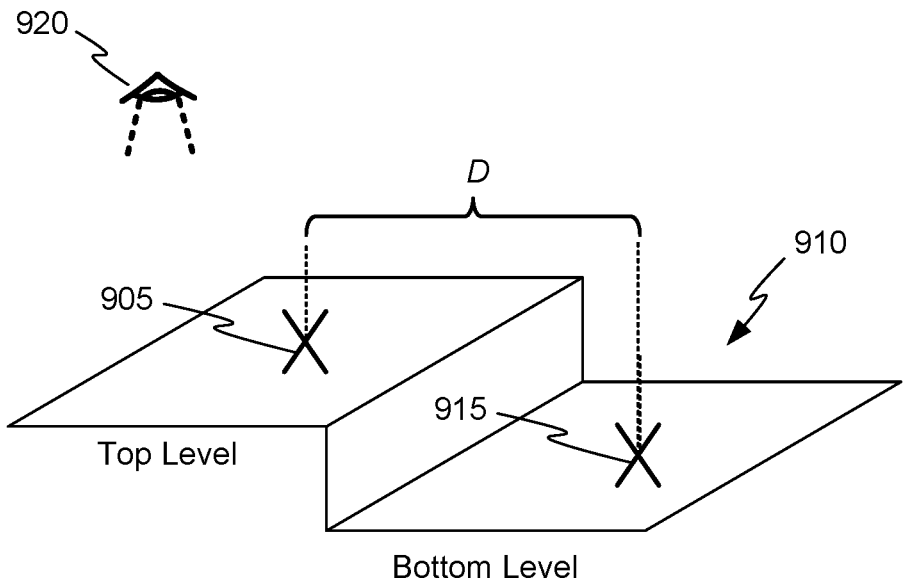
FIGS. 9A and 9B are simplified perspective view down illustrations of a milled box in according to some embodiments.

As shown in FIG. 9A, when a set of SEM images are taken from a tilt angle of 0 degrees (represented by viewing perspective 920), the small FOV image taken of mark 915 (e.g., image 740*a*) can be taken at a distance, D, away from the small FOV image taken of mark 905 (e.g., image 730*a*). D is a distance known to the imaging system as discussed above. It is the same distance used by the system when FIB column 120 formed the two registrations marks 905 and 915.

Figure 9B:
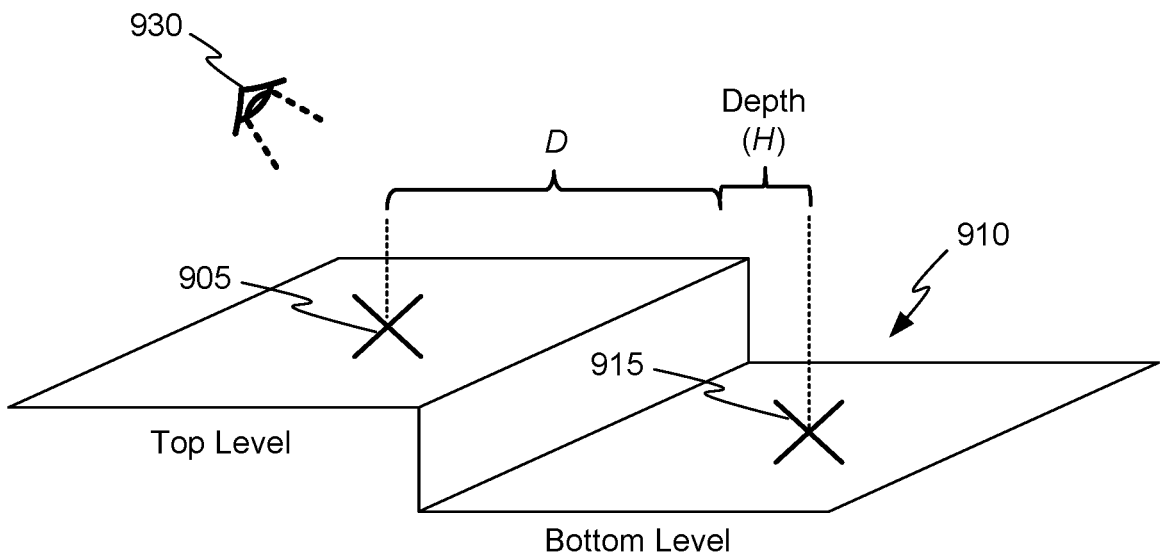

When a second set of images is taken from a non-zero tilt angle, registration mark 915 will appear further away from mark 905. For example, FIG. 9B illustrates the increased spacing between marks 905 and 915 when the marks are viewed from a 45 degree tilt angle (represented by viewing perspective 930). Thus, in order to ensure that the small FOV image of registration mark 915 (e.g., image 740*b*) accurately captures the mark, the image can be taken at a distance D+H where D is the same known distance between the two marks discussed above and H is the expected depth or height of milled box 910. The tangent of 0 degrees is 0 and the tangent of 45 degrees is 1. Thus, if either set of images is taken at a tilt angle other than 0 or 45 degrees, the distance between the two images can be determined based on the known the spacing between the small FOV image of mark, the tangent of the tilt angle and the expected depth of the milled box.

4. Techniques for Determining the Depth of Milled Boxes

Once the registration marks are identified and images of the registration marks taken at the two different angles, embodiments disclosed herein can use any one of several different techniques to calculate the height of the milled box. Three specific techniques are discussed below.

a) Matching Images Via Stretching the Y-Axis

In a first technique, the images in the first and second sets can be registered (matched) to each other by stretching the set of the images at the larger tilt angle along the vertical axis (Y-axis) until the dimensions of the pixels matches the dimensions of the pixels at the smaller tilt angle. For example, if the smaller tilt angle is taken at an angle normal to the sample surface (0 degrees) and the pixels of images in the first set of images are squares, the pixels of the second set images taken at the larger tilt angle will be rectangles in which the horizontal dimension (X-axis) of each pixel is larger than its vertical dimension (Y-axis). Stretching the second set of images in the vertical direction so that the pixels in the second set of images are also squares, allows the images in the first of images to be registered to those in the second set of images.

The depth of the milled hole can then be calculated based on the following formulas:

$$H = \text{depth} + \Delta H \quad (3)$$

$$\Delta H = (Y_{top0} - Y_{top45}) - (Y_{bottom0} - Y_{bottom45}) \quad (4)$$

Where H refers to the actual height or depth of the milled box, depth refers to the estimated depth of the box (a value that is previously known based on the milling box recipe as discussed above), and $\Delta H$ equals the measured deviation of the depth between the first and second sets of images. Thus, the difference $(Y_{top0} - Y_{top45})$ can be obtained by registering the top image in the first set of images (0 degree tilt angle) with the top image in the second set of images (45 degree tilt angle). The difference $(Y_{bottom0} - Y_{bottom45})$ can be obtained by registering the bottom image in the first set of images (0 degree tilt angle) with the bottom image in the second set of images (45 degree tilt angle).

b) Pattern Recognition Algorithm

In a second technique, a unique pattern center (or other unique location) on each registration mark in the first and second sets of images can be identified using pattern recognition techniques. As an example, if the registration marks are X marks, the center of the X in each mark can be the unique location.

Once the unique location is identified in the images, the depth of the milled hole can then be calculated based on the following formulas:

$$H = \text{depth} + \Delta H \quad (5)$$

$$\Delta H = (Y_{top0} - Y_{bottom0}) - (Y_{top45} - Y_{bottom45}) \quad (6)$$

Where H refers to the actual height or depth of the milled box, depth refers to the estimated depth of the box (a value that is previously known based on the milling box recipe as discussed above), and $\Delta H$ equals the measured deviation of the depth between the first and second sets of images. As described with respect to the first set of equations, the coordinates $Y_{top0}$, $Y_{bottom0}$, $Y_{top45}$, and $Y_{bottom45}$ are the Y-axis coordinates of the feature in their respective images.

c) Register Images with a Golden Site

A third technique registers images of the same level and tilt between two sites. This enables a difference in depth between a golden site (with a known height) and another site to be obtained. As used herein, a golden site is a site that was processed in exactly the same way on the same sample or another similar sample and which its depth is known by an independent method.

Using this technique, the depth of the milled hole can then be calculated based on the following formulas:

$$H = H_{golden} + \Delta H \quad (7)$$

$$\Delta H = [(Y_{top45} - Y_{top45golden}) - \quad (8)$$
$$(Y_{bottom45} - Y_{bottom45golden})] - [(Y_{top0} - Y_{top0golden}) -$$
$$(Y_{bottom0} - Y_{bottom0golden})]$$

Where H refers to the actual height or depth of the milled box, $H_{golden}$ refers to the known height of the golden site, and $\Delta H$ equals the measured deviation of the depth between the golden site and the first and second sets of images. A similar nomenclature is used in formula (8) as used in formulas (4) and (6). Thus, the coordinates $Y_{top0}$, $Y_{bottom0}$, $Y_{top0golden}$, $Y_{bottom0golden}$, $Y_{top45}$, $Y_{bottom45}$, $Y_{top45golden}$, and $Y_{bottom45golden}$ are the Y-axis coordinates of the feature in their respective images.

5. Process Flow for Measuring the Depth of Multiple Milled Boxes on a Sample

In some embodiments, multiple holes or boxes are milled at different locations on a sample to delayer the sample at each of the different locations. In some sample evaluation tools, moving a sample within a processing chamber such that the different delayering locations are under the FOV of a charged particle column can be done relatively quickly while tilting the SEM column between two different angles (e.g., between 0 degrees and 45 degrees) can require considerably more time. Thus, in order to maximize throughput, some embodiments will mill boxes at multiple locations on a sample, form registration marks at the top and bottom levels of each milled box and separately image the top and bottom registration marks of each milled box at the first tilt angle prior to imaging the top and bottom registration marks at the second tilt angle.

Figure 10A:
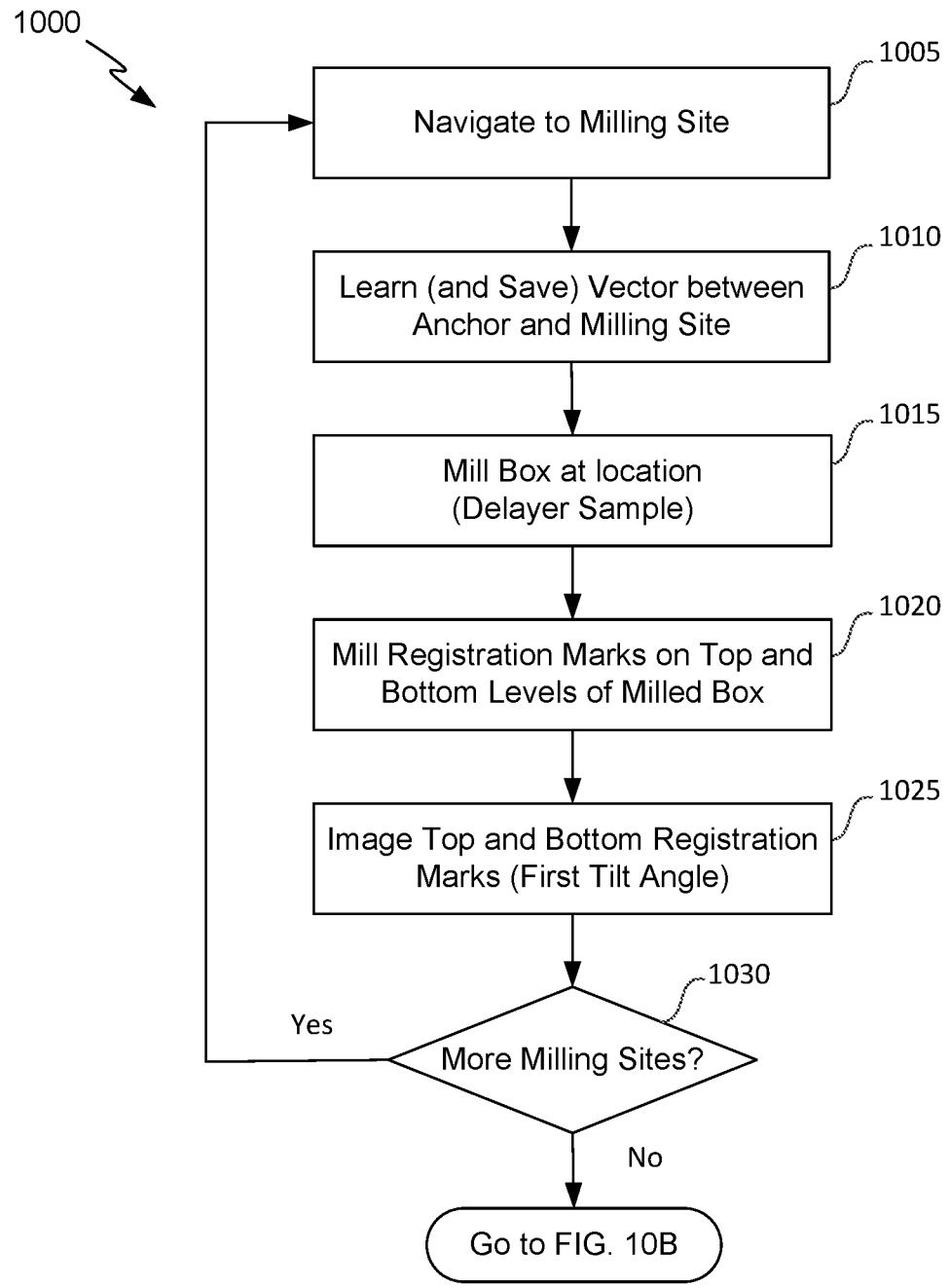
FIGS. 10A and 10B represent a simplified flow chart depicting the steps associated with a method of determining the depth of a milled hole according to some embodiments.
Figure 10B:
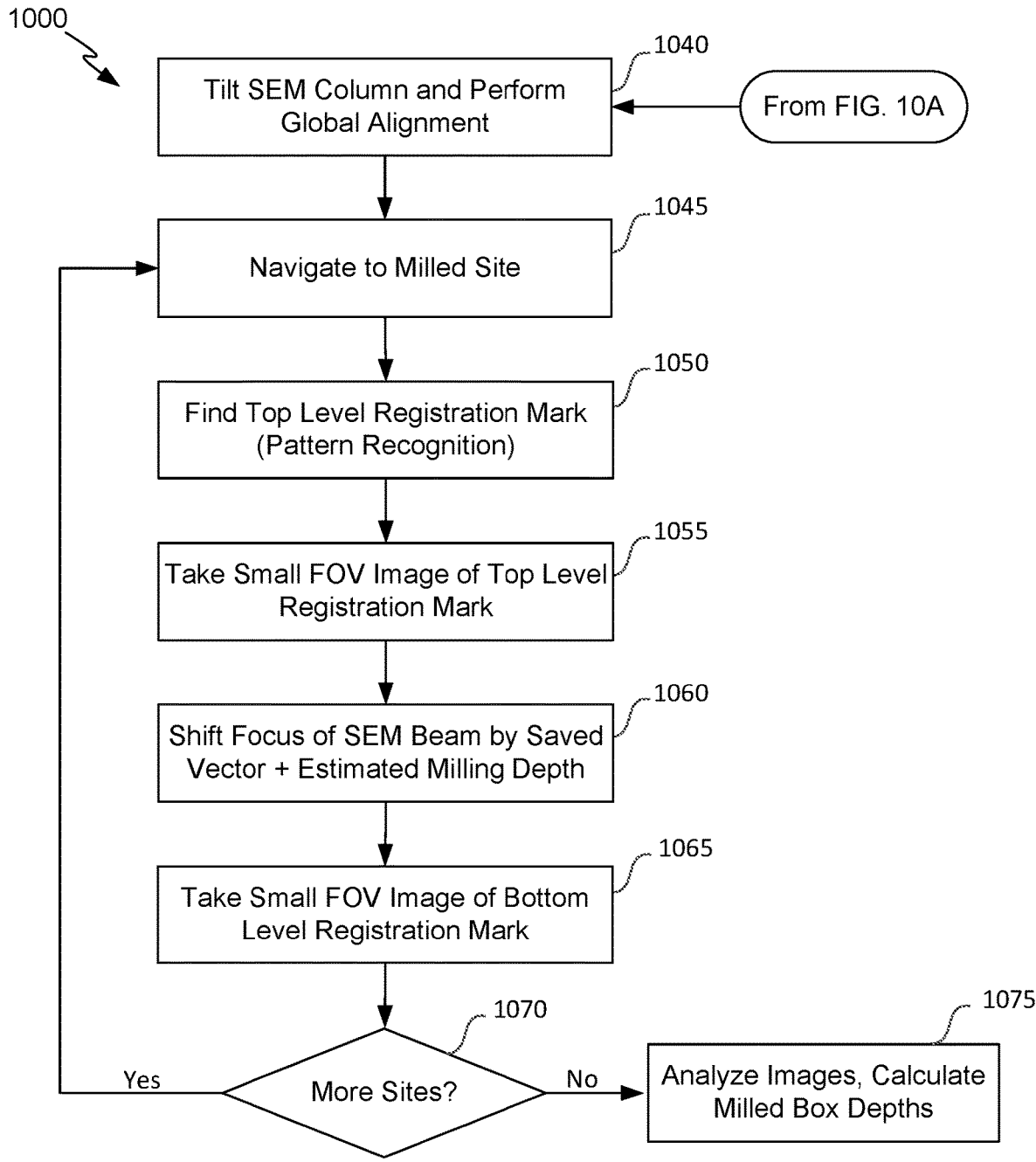

FIGS. 10A and 10B are simplified flow charts depicting steps of a method 1000 according to some embodiments in which multiple milled boxes are formed at different locations (i.e., different regions of interest) on a sample. In some embodiments both FIB column 120 and SEM column 130 are set at a tilt angle of 0 degrees the steps shown in FIG. 10A and SEM column 130 is tilted to 45 degrees during the imaging steps shown in FIG. 10B.

As shown in FIG. 10A, method 1000 starts by positioning a sample (e.g., sample 700 prior to the formation of box 710 and registration marks 705, 715) on a sample support in a chamber of an appropriate evaluation system and moving a first region of interest (i.e., a region to be evaluated) on the sample 700 under the field of view of the focused ion beam column 120 (block 1005). An anchor location spaced apart from the milling site can be identified and a vector between the anchor location and the center of the milling site can be saved in computer-readable memory of the evaluation system (block 1010) as discussed above.

The region of interest can then be delayered forming a milled box 710 (block 1015) and registration marks 705, 715 can be milled at the top and bottom levels of the milled box, respectively (block 1020) as described in FIG. 8. In some embodiments, the registration marks can be in the form of an "X" with the center of the X of registration mark 705 formed at the anchor location on the top level and the center of the X of registration mark 715 formed at the center of the milling site (i.e., the location identified by the saved vector). Embodiments are not limited to any particular shape or type of registration mark, however, and other types of registration marks can be milled into sample 700 in embodiments.

After registration marks 705, 715 have been formed, the sample can be moved within chamber 110 such that the region of interest is under the field of view of SEM column 130 and a first set of small FOV images of the registration marks can then taken by the SEM column (block 1025). This first set of small FOV images is taken with SEM column 130 positioned at a first tilt angle as described above in conjunction with FIG. 8, block 840.

If there are more regions of interest to delayer on the sample (block 1030, yes), stage 140 can move the sample such that the next region of interest is under the field of view of FIB column 120 and block 1010 to 1025 are repeated at the new region of interest. Once every region of interest on sample 700 has been delayered and imaged with SEM column 130 set at the first tilt level (block 1030, no), the SEM column can be set to the second tilt level and a global registration can be performed (FIG. 10B, block 1040) so that the images taken at the second tilt level can be accurately registered to the same locations as images taken at the first tilt level.

Next, sample 700 can be moved within the evaluation tool so that one of the regions of interest is positioned under the field of view of SEM column 130 (block 1045). The top level registration mark 705 can be identified using known pattern recognition techniques (block 1050) and a small FOV image can be taken of the top level registration mark 705 at the new, second tilt angle (block 1055). The focus of SEM column 130 can then be shifted to the expected location of lower level registration mark 715 in the manner discussed above (block 1060), and a small FOV image can be taken of the lower level registration mark (block 1065).

If there are more regions of interest for which images of the top and bottom level registration marks need to be taken at the second tilt angle (block 1070, yes), stage 140 can move the sample such that the next region of interest is under the field of view of SEM column 130 and block 1050 to 1065 are repeated at the next region of interest. Once every region of interest on sample 700 has been imaged with SEM column 130 set at the second tilt level (block 1070, no), the milling and imaging operations are complete and the captured images can be analyzed to determine the height of each milled box using one of the techniques described above (block 1075).

Example of a Sample to be Milled and Measured

Figure 11:
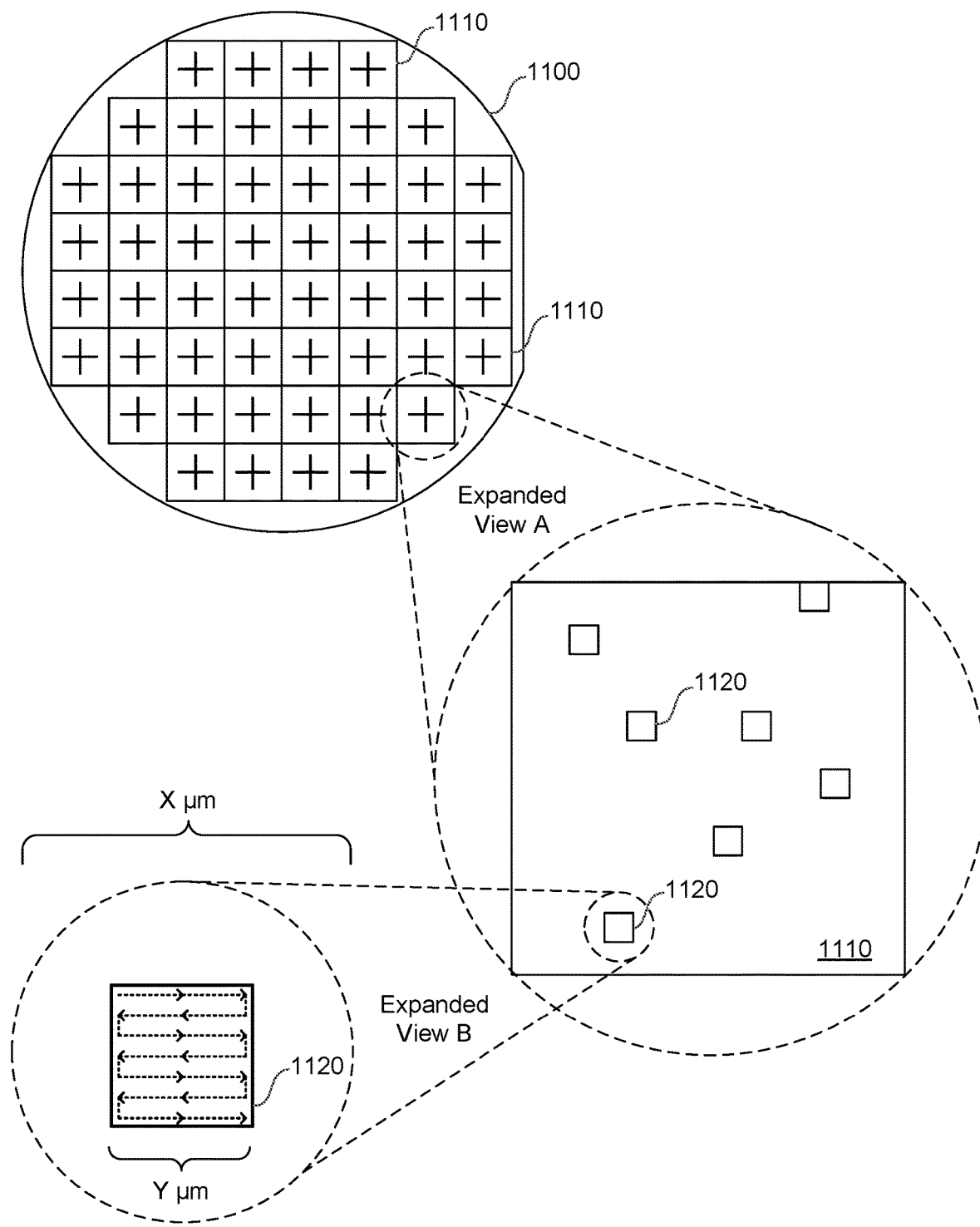
FIG. 11 is a simplified illustration of a sample that can have a structure or buried layer formed thereon and measured in accordance with the embodiments disclosed herein.

As stated above, embodiments of the disclosure can be used to determine the depth of a hole milled in a sample. Embodiments can be used to determine the depth of milled holes within many different types of samples including electronic circuits formed on semiconductor structures, solar cells formed on a polycrystalline or other substrate, nanostructures formed on various substrates and the like. As one non-limiting example, FIG. 11 is a simplified illustration of an area on a semiconductor wafer that can be include a milled hole that can have its depth determined according to embodiments described herein. Specifically, FIG. 11 includes a top view of wafer 1100 along with two expanded views of specific portions of wafer 1100. Wafer 1100 can be, for example, a 150 mm, 200 mm or 300 mm semiconductor wafer and can include multiple integrated circuits 1110 (fifty two in the example depicted) formed thereon. The integrated circuits 1110 can be at an intermediate stage of fabrication and the techniques described herein can be used to evaluate and analyze one or more regions 1120 of the integrated circuits.

Embodiments of the disclosure can analyze and evaluate region 1120 by sequentially milling away material within the region forming a milled hole. The depth of the milled hole can then be accurately determined as described above. When milling the hole, the milling process can mill region 1120 by scanning the FIB back and forth within the region according to a raster pattern until the hole has been milled to a desired depth. The techniques described herein can then be used to determine the depth of the milled hole with a very high degree of accuracy.

Additional Embodiments

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. For example, while the illustrative embodiments discussed above all included milling operations that formed the first and second registration marks on the upper and lower levels of the box or whole, embodiments are not constrained to such. In some embodiments, either or both of the first and/or second registration marks can be features that were part of the sample prior to the milling process. That is, the first registration mark can be a uniquely identifiable feature at the upper level/top of the milled box or hole. Similarly, the second registration mark can be a uniquely identifiable feature on the lower level/bottom of the milled box that was part of the sample, buried beneath the sample surface, prior to milling and then exposed at the lower level by the milling process.

As another example, while the illustrative embodiments discussed above provided images of the top surface and bottom surface marks that were non-overlapping, it is possible in some embodiments for portions of the images to overlap. The smaller the FOV is for each image, however, the higher the resolution will be. Having portions of the images overlapping generally means that a smaller FOV for the images could have been chosen resulting in higher accuracy height calculations. Additionally, while various simplified drawings of holes in which the depth can be measured are discussed herein as examples, it is to be understood that the examples are generally highly simplified drawings for illustrative purposes only. Actual holes milled in samples can have different topographies than those depicted in the figures and embodiments described herein are not limited to any particular shape or topography of milled holes. Additionally, while the profile of the milled boxes or holes discussed above are often depicted in the included figures as being smooth, it should be appreciated that the profile can be rough and jagged on a micro-level without significantly impacting the depth measurement techniques described herein.

Also, while different embodiments of the disclosure were disclosed above, the specific details of particular embodiments may be combined in any suitable manner without departing from the spirit and scope of embodiments of the disclosure. Further, it will be apparent to one of ordinary skill in the art that many modifications and variations are possible in view of the above teachings. It is, therefore, to be understood that the appended claims are intended to cover all such modifications and changes as fall within the true spirit of the embodiments of the disclosure.

Additionally, any reference in the specification above to a method should be applied mutatis mutandis to a system capable of executing the method and should be applied mutatis mutandis to a computer program product that stores instructions that once executed result in the execution of the method. Similarly, any reference in the specification above to a system should be applied mutatis mutandis to a method that may be executed by the system and should be applied mutatis mutandis to a computer program product that stores instructions that can be executed by the system; and any reference in the specification to a computer program product should be applied mutatis mutandis to a method that may be executed when executing instructions stored in the computer program product and should be applied mutandis to a system that is configured to executing instructions stored in the computer program product.

Also, where the illustrated embodiments of the present disclosure can, for the most part, be implemented using electronic components and circuits known to those skilled in the art, details of such are not be explained in any greater extent than that considered necessary as illustrated above, for the understanding and appreciation of the underlying concepts of the present disclosure and in order not to obfuscate or distract from the teachings of the present disclosure.

What is claimed is:

1. A method of determining a depth of a hole milled into a first region of a sample, the method comprising:
    positioning the sample in a processing chamber having a charged particle beam column;
    milling a hole in the first region of the sample using a charged particle beam generated by the charged particle beam column;
    identifying a first registration mark at an upper level of the milled hole;
    identifying a second registration mark at a lower level of the milled hole;
    taking a first set of images at a first tilt angle, the first set of images including a first image taken with a field of view that captures the first registration mark but not the second registration mark, and a second image taken with a field of view that captures the second registration mark but not the first registration mark;

taking a second set of images at a second tilt angle, different than the first tilt angle, the second set of images including a third image taken with a field of view that captures the first registration mark but not the second registration mark, and a fourth image taken with a field of view that captures the second registration mark but not the first registration mark; and using stereoscopic measurement techniques to determine the depth of the hole based on the first and second sets of images.

2. The method of determining the depth of a hole set forth in claim 1 wherein the first registration mark is milled at the upper level of the milled hole.

3. The method of determining the depth of a hole set forth in claim 1 wherein the second registration mark is milled at the lower level of the milled hole using the charged particle beam.

4. The method of determining the depth of a hole set forth in claim 1 wherein the first tilt angle is zero degrees and the second tilt angle is 45 degrees.

5. The method of determining the depth of a hole set forth in claim 1 the first image of the first registration mark and the first image of the second registration mark are non-overlapping images and the second image of the first registration mark and the second image of the second registration mark are non-overlapping images.

6. The method of determining the depth of a hole set forth in claim 1 wherein determining the depth of the hole comprises registering images in the first and second sets of images to each other by stretching the set of the images in the second set of images along a vertical axis until dimensions of pixels in the second set of images are proportional to dimensions of pixels in the first set of images.

7. The method of determining the depth of a hole set forth in claim 1 wherein determining the depth of the hole comprises using image recognition techniques to identify a unique location on each registration mark in the first and second sets of images.

8. The method of determining the depth of a hole set forth in claim 1 wherein determining the depth of the hole comprises registering images at the upper level in the first and second sets of images to images of a uniquely identifiable mark on the sample at a known height and registering images at the lower level in the first and second sets of images to images of the uniquely identifiable mark.

9. The method of determining the depth of a hole set forth in claim 1 wherein the charged particle beam column is a focused ion beam column and the charged particle beam is an ion beam, and wherein the first and second sets of images comprise images taken from an scanning electron microscope.

10. The method of determining the depth of a hole set forth in claim 1 wherein the first registration mark is milled at the upper level of the milled hole and the second registration mark is milled at the lower level of the milled hole using the charged particle beam.

11. A method of determining a depth of a plurality holes milled into a sample at a plurality of different regions of interest spaced apart from each other at an upper surface of the sample, the method comprising:

positioning the sample in a processing chamber having a focused ion beam column and a scanning electron microscope column and setting a tilt angle of the scanning electron microscope column at a first tilt angle;

milling and imaging each region of interest in the plurality of regions of interest by:
 a) moving the sample within the processing chamber to position a region of interest within a field of view of the focused ion beam column;
 b) milling, with a charged particle beam generated by the focused ion beam column, a hole in the region of interest, a first registration mark at an upper level of the milled hole, and a second registration mark at a lower level of the milled hole;
 c) moving the sample withing the processing chamber to position the region of interest within a field of view of the scanning electron microscope;
 d) taking a first set of images at the first tilt angle, the first set of images including a first image taken with a field of view that captures the first registration mark but not the second registration mark, and a second image taken with a field of view that captures the second registration mark but not the first registration mark; and
 e) repeating steps (a) to (e) for a next region of interest in the plurality of regions of interest until all the regions of interest have been milled and imaged at the first tilt angle;

changing the tilt angle of the scanning electron microscope column to a second tilt angle, different than the first tilt angle; and imaging each region of interest of interest in the plurality of region of interest at the second tilt angle by:
 f) moving the sample within the processing chamber to position a region of interest within the field of view of the scanning electron microscope;
 g) taking a second set of images at the second tilt angle, the second set of images including a third image taken with a field of view that captures the first registration mark but not the second registration mark, and a fourth image taken with a field of view that captures the second registration mark but not the first registration mark; and
 h) repeating steps (f) and (g) for a next region of interest in the plurality of regions of interest until all the regions of interest have been imaged at the second tilt angle; and using stereoscopic measurement techniques to calculate the depth of the hole based on the first and second sets of images.

12. The method of determining the depth of a hole set forth in claim 11 wherein the first tilt angle is zero degrees and the second tilt angle is 45 degrees.

13. The method of determining the depth of a hole set forth in claim 11 wherein the first image of the first registration mark and the first image of the second registration mark are non-overlapping images and the second image of the first registration mark and the second image of the second registration mark are non-overlapping images.

14. The method of determining the depth of a hole set forth in claim 11 wherein determining the depth of the hole comprises registering images in the first and second sets of images to each other by stretching the set of the images in the second set of images along a vertical axis until dimensions of pixels in the second set of images are proportional to dimensions of pixels in the first set of images.

15. The method of determining the depth of a hole set forth in claim 14 wherein determining the depth of the hole comprises using image recognition techniques to identify a unique location on each registration mark in the first and second sets of images.

16. The method of determining the depth of a hole set forth in claim 14 wherein determining the depth of the hole comprises registering images at the top level in the first and second sets of images to images of a uniquely identifiable mark on the sample at a known height and registering images at the bottom level in the first and second sets of images to images of the uniquely identifiable mark.

17. A system for for determining a depth of a hole milled into a first region of a sample, the system comprising:
- a vacuum chamber;
- a sample support configured to hold a sample within the vacuum chamber during a milling process;
- a charged particle beam column configured to direct a charged particle beam into the vacuum chamber;
- a processor and a memory coupled to the processor, the memory including a plurality of computer-readable instructions that, when executed by the processor, cause the system to:
  - position the sample in a processing chamber having a charged particle beam column;
  - mill a hole in the first region of the sample using a charged particle beam generated by the charged particle beam column;
  - identify a first registration mark at an upper level of the milled hole;
  - identify a second registration mark at a lower level of the milled hole;
  - take a first set of images at a first tilt angle, the first set of images including a first image taken with a field of view that captures the first registration mark but not the second registration mark, and a second image taken with a field of view that captures the second registration mark but not the first registration mark;
  - take a second set of images at a second tilt angle, different than the first tilt angle, the second set of images including a third image taken with a field of view that captures the first registration mark but not the second registration mark, and a fourth image taken with a field of view that captures the second registration mark but not the first registration mark;
  - use stereoscopic measurement techniques to determine the depth of the hole based on the first and second sets of images.

18. The system for determining a depth of a hole milled into a sample set forth in claim 17 wherein the first tilt angle is zero degrees and the second tilt angle is 45 degrees.

19. The system for determining a depth of a hole milled into a sample set forth in claim 17 wherein the first image of the first registration mark and the first image of the second registration mark are non-overlapping images and the second image of the first registration mark and the second image of the second registration mark are non-overlapping images.

20. The system for determining a depth of a hole milled into a sample set forth in claim 17 wherein the first registration mark is milled at the upper level of the milled hole and the second registration mark is milled at the lower level of the milled hole using the charged particle beam.

* * * * *